United States Patent
Nishimura et al.

(10) Patent No.: US 8,073,155 B2
(45) Date of Patent: Dec. 6, 2011

(54) SYSTEM FOR REPRODUCING AUDIO INFORMATION CORRESPONDING TO A POSITION WITHIN A DISPLAYED IMAGE

(75) Inventors: Takuichi Nishimura, Tokyo (JP); Hideyuki Nakashima, Tokyo (JP); Ikuko Yairi, Tokyo (JP); Seiji Igi, Tokyo (JP)

(73) Assignees: National Institute of Advanced Industrial Science and Technology, Tokyo (JP); National Institute of Information and Communications Technology, Incorporated Administrative Agency, Tokyo (JP)

( * ) Notice: Subject to any disclaimer, the term of this patent is extended or adjusted under 35 U.S.C. 154(b) by 1268 days.

(21) Appl. No.: 10/539,350

(22) PCT Filed: Dec. 16, 2003

(86) PCT No.: PCT/JP03/16110
§ 371 (c)(1),
(2), (4) Date: May 16, 2007

(87) PCT Pub. No.: WO2004/056153
PCT Pub. Date: Jul. 1, 2004

(65) Prior Publication Data
US 2008/0025548 A1    Jan. 31, 2008

(30) Foreign Application Priority Data
Dec. 16, 2002    (JP) .................................. 2002-364471

(51) Int. Cl.
*H04B 3/00*    (2006.01)
*G09B 5/00*    (2006.01)

(52) U.S. Cl. .......................................... 381/80; 434/308
(58) Field of Classification Search .................. 381/306, 381/310, 77, 80; 345/173; 434/116, 308, 434/319, 325, 336, 337; 348/14.03
See application file for complete search history.

(56) References Cited

U.S. PATENT DOCUMENTS

| 3,245,157 A | * | 4/1966 | Laviana | ..................... 434/307 R |
| 3,273,260 A | * | 9/1966 | Walker | ....................... 434/307 R |
| 4,336,018 A | * | 6/1982 | Marshall et al. | ................. 434/22 |
| 4,824,375 A | * | 4/1989 | Weiner | ........................... 434/319 |
| 2001/0036353 A1 | | 11/2001 | Ochiai et al. | |

FOREIGN PATENT DOCUMENTS

| JP | 6-202648 | 7/1994 |
| JP | 8-263006 | 10/1996 |
| JP | 10-222108 | 8/1998 |
| JP | 2002-116858 | 4/2002 |

* cited by examiner

*Primary Examiner* — Vivian Chin
*Assistant Examiner* — Kile Blair
(74) *Attorney, Agent, or Firm* — Wenderoth, Lind & Ponack, L.L.P.

(57) ABSTRACT

A system for reproducing audio information corresponding to a position within a displayed image comprising an image display device (1) which shows an image, an audio output device (2) which outputs an electromagnetic wave modulated by audio information toward any given positions in the image shown on the image display device (1), and an audio reproducing terminal (3) which receives the electromagnetic wave at the position in the image, converts it to an electric signal and reproduces sound from that electric signal, wherein audio information support can be individually realized for each of the users watching the image.

31 Claims, 31 Drawing Sheets

US 8,073,155 B2

SYSTEM FOR REPRODUCING AUDIO INFORMATION CORRESPONDING TO A POSITION WITHIN A DISPLAYED IMAGE

TECHNICAL FIELD

The present invention of the application relates to an audio information support system. More specifically, the invention of the application relates to a novel audio information support system which can implement audio information support that separately responds to individual users watching an image shown on a screen and the like.

BACKGROUND ART

Traditionally, an information system is known in which a screen is built in a table top and an image is projected by a projector from underneath (see Patent Reference 1). With this information system, many users around the table can watch the image at the same time.

Patent Reference 1: JP-A-2001-75733

However, the information system described in the Patent Reference 1 allows the users only to watch an image shown on the table but not to separately listen to the sound relating to the image (such as voice, music, and signal sound; hereinafter the same) which each user wants to listening to, when he/she wants to listen to it. Of course, it is proposed in the Patent Reference 1 to output sound along with the image, but audio information is carried from a speaker to all the users around the table, and all the users always listen to the same sound at one time.

More specifically, audio information support has not been implemented yet which separately responds to individual users watching an image to acquire audio information that a single user wants now and here.

DISCLOSURE OF THE INVENTION

Then, in view of the circumstances described above, an object of the invention of the application is to provide a completely novel audio information support system which can implement audio information support that separately responds to individual users watching an image (either still picture or motion picture; hereinafter the same) on a screen or any of a variety of displays.

The invention of the application solves the above problem by providing an audio information support system, as shown in the functional block example diagram of FIG. 1, characterized by including:

an image display device (1) which shows an image;

an audio output device (2) which outputs an electromagnetic wave modulated by audio information toward one or multiple positions in the image shown on the image display device (1); and an audio reproducing terminal (3) having:

a converting means (31) which receives the electromagnetic wave at the position where it hits the image and converts the wave to an electric signal; and an audio reproducing means (32) which reproduces sound from the electric signal generated by the converting means (31).

Secondly, as shown in the functional block example diagram of FIG. 2, the invention provides an audio information support system characterized by including:

an image display device (1) which shows an image;

an audio output device (2) which outputs an electromagnetic wave modulated by audio information toward one or multiple positions in the image shown on the image display device (1);

an audio reproducing terminal (3) having:

a converting means (31) which receives the electromagnetic wave at the position where it hits the image, and converts the wave to an electric signal;

an audio reproducing means (32) which reproduces sound from the electric signal generated by the converting means (31); and an ID transmission means (33) which transmits an ID; and an ID detection device (4) which detects the ID transmitted by the ID transmission means (33) of the audio reproducing terminal (3).

Thirdly, as shown in the functional block example diagram of FIG. 3, the invention provides an audio information support system characterized by including:

an image display device (1) which shows an image;

an audio output device (2) which outputs an electromagnetic wave modulated by audio information toward one or multiple positions in the image shown on the image display device (1);

an audio reproducing terminal (3) having:

a converting means (31) which receives the electromagnetic wave at the position where it hits the image and converts the wave to an electric signal; and an audio reproducing means (32) which reproduces sound from the electric signal generated by the converting means (31); and a position detection device (5) which detects the position of the audio reproducing terminal (3).

Fourthly, as shown in the functional block example diagram of FIG. 4, the invention provides an audio information support system characterized by including:

an image display device (1) which shows an image;

an audio output device (2) which outputs an electromagnetic wave modulated by audio information toward one or multiple positions in the image shown on the image display device (1);

an audio reproducing terminal (3) having:

a converting means (31) which receives the electromagnetic wave at the position where it hits the image and converts the wave to an electric signal;

an audio reproducing means (32) which reproduces sound from the electric signal generated by the converting means (31); and an ID transmitting means (33) which transmits an ID;

an ID detection device (4) which detects the ID transmitted by the ID transmission means (33) of the audio reproducing terminal (3); and a position detection device (5) which detects the position of the audio reproducing terminal (3).

Furthermore, fifthly, as shown in the functional block example diagram of FIG. 5, the invention provides an audio information support system characterized in that the image display device (1) has: a screen means (11) which shows an image; and an image projecting means (12) which projects an image onto the screen means. Sixthly, the invention provides an audio information support system characterized in that the screen means (11) has a flat, curved or irregular image display surface. Seventhly, the invention provides an audio information support system characterized in that the screen means (11) has a translucent image display surface. Eighthly, the invention provides an audio information support system characterized in that the image projecting means (12) projects an image onto the screen means from the image display surface side. Ninthly, the invention provides an audio information support system characterized in that the image projecting means (12) projects an image onto the screen means from the side opposite to its image display surface.

Moreover, tenthly, the invention provides an audio information support system characterized in that the image display device (1) is a cathode-ray tube display. Eleventhly, the invention provides an audio information support system characterized in that the image display device (1) is a flat panel display. Twelfthly, the invention provides an audio information support system characterized in that the flat panel display is a liquid crystal display, a plasma display, an electroluminescent display, a light-emitting diode display, a vacuum fluorescent display, or an electrolytic emission display.

Moreover, thirteenthly, as shown in the functional block example diagram of FIG. 6, the invention provides an audio information support system characterized in that the audio output device (2) has: a modulating means (21) which modulates an electromagnetic wave by audio information; and an electromagnetic wave irradiating means (22) which emits the electromagnetic wave modulated by the modulating means (21) toward the position in the image. Fourteenthly, the invention provides an audio information support system characterized in that the electromagnetic wave irradiating means (22) has an electromagnetic wave source which outputs an electromagnetic wave. Fifteenthly, the invention provides an audio information support system characterized in that there are plural electromagnetic wave sources disposed so as to correspond respectively to multiple positions in the image. Sixteenthly, the invention provides an audio information support system characterized in that there is one or a plurality of electromagnetic wave sources that can change their irradiating direction toward multiple positions in the image. Seventeenthly, the invention provides an audio information support system characterized in that the electromagnetic wave source is a light source which outputs light as an electromagnetic wave. Eighteenthly, the invention provides an audio information support system characterized in that the light source is a light-emitting diode or laser. Ninteenthly, the invention provides an audio information support system characterized in that light from the light source is emitted onto a position in the image after passing through an optical cable.

Besides, twentiethly, the invention provides an audio information support system characterized in that the converting means (31) of the audio reproducing terminal (3) is a converting means which receives light from the light source of the electromagnetic wave irradiating means and converts this to electricity. Twenty-firstly, the invention provides an audio information support system characterized in that the photoelectric converting means is a solar cell. Twenty-secondly, the converting means (31) of the audio reproducing terminal (3) is wearable on a part of a terminal user's body. Twenty-thirdly, the invention provides an audio information support system characterized in that the part of the body is a hand or a foot. Twenty-fourthly, the invention provides an audio information support system characterized in that the converting means (31) of the audio reproducing terminal (3) is mountable on or built in a rod held by a terminal user. Twenty-fifthly, the invention provides an audio information support system characterized in that the audio reproducing means (32) of the audio reproducing terminal (3) is an earphone, a headphone, or a speaker. Twenty-sixthly, the invention provides an audio information support system characterized in that the audio reproducing terminal (3) is a battery-less terminal that does not need a separate drive power source.

Furthermore, twenty-seventhly, as shown in the functional block example diagram of FIG. 7, the invention provides an audio information support system characterized in that the ID transmitting means (33) of the audio reproducing terminal (3) is an RFID tag (34); and the ID detection device (4) is a reader-writer (41) that conducts communication for ID authentication with the RFID tag. Twenty-eighthly, as shown in the functional block example diagram of FIG. 8, the invention provides an audio information support system characterized in that the ID transmitting means (33) of the audio reproducing terminal (3) is an optical ID tag (35); and the ID detection device (4) is an infrared sensor (42) that receives ID infrared light emitted by the optical ID tag and outputs ID data. Twenty-ninthly, as shown in the functional block example diagram of FIG. 9, the invention provides an audio information support system characterized in that the optical ID tag (35) has: an infrared light source (35*a*) for ID infrared light; an ID storing means (35*b*) which stores ID data; and a modulating means (35*c*) which modulates infrared light with ID data ID; and the infrared sensor (42) receives ID infrared light modulated and transmitted by the optical ID tag (35) and outputs ID data.

Then, as shown in the functional block example diagram of FIG. 10, thirtiethly, the invention provides an audio information support system characterized in that the position detection device (5) has: an infrared light source (51) for emitting infrared light used in positioning; an infrared imaging means (52) which captures the positioning-use infrared light reflected back by the audio reproducing terminal (3); and a position detecting means (53) which detects a position of the audio reproducing terminal (3) based on the position of the positioning-use infrared light in the image taken by the infrared imaging means (52); and the audio reproducing terminal (3) has a reflecting means (36) which reflects the position infrared light transmitted from the position detection device (5). Thirty-firstly, the invention provides an audio information support system characterized in that the position detection device (5) has: a touch panel disposed on an image display surface of the image display device (1); and a position detecting means which detects the position of the audio reproducing terminal (3) based on the position where a terminal user touches the touch panel.

BEST MODE FOR CARRYING OUT THE INVENTION

First Embodiment

Figure 11:
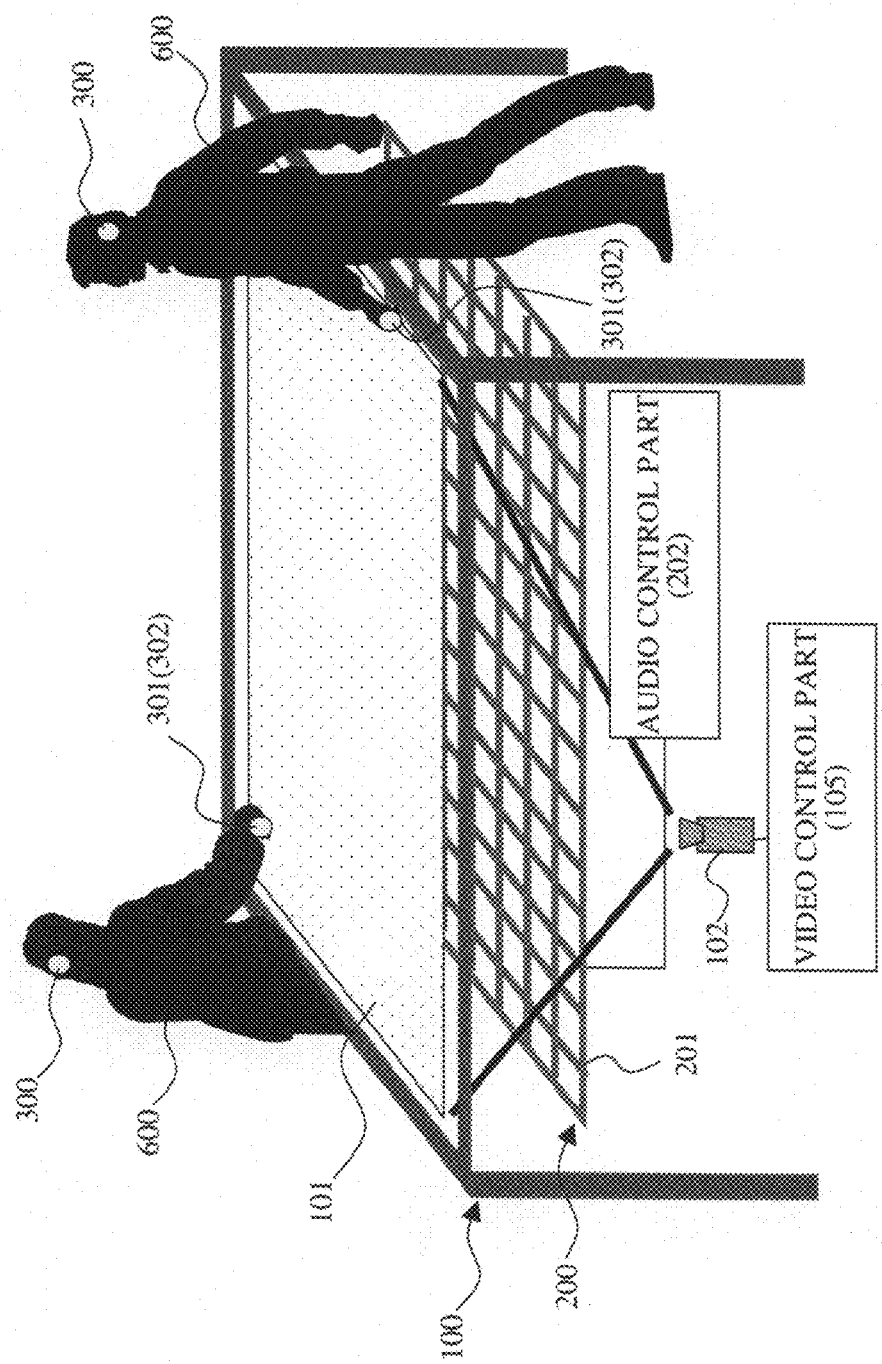
FIG. 11 is a schematic diagram illustrating an embodiment of the invention of the application.
Figure 12:
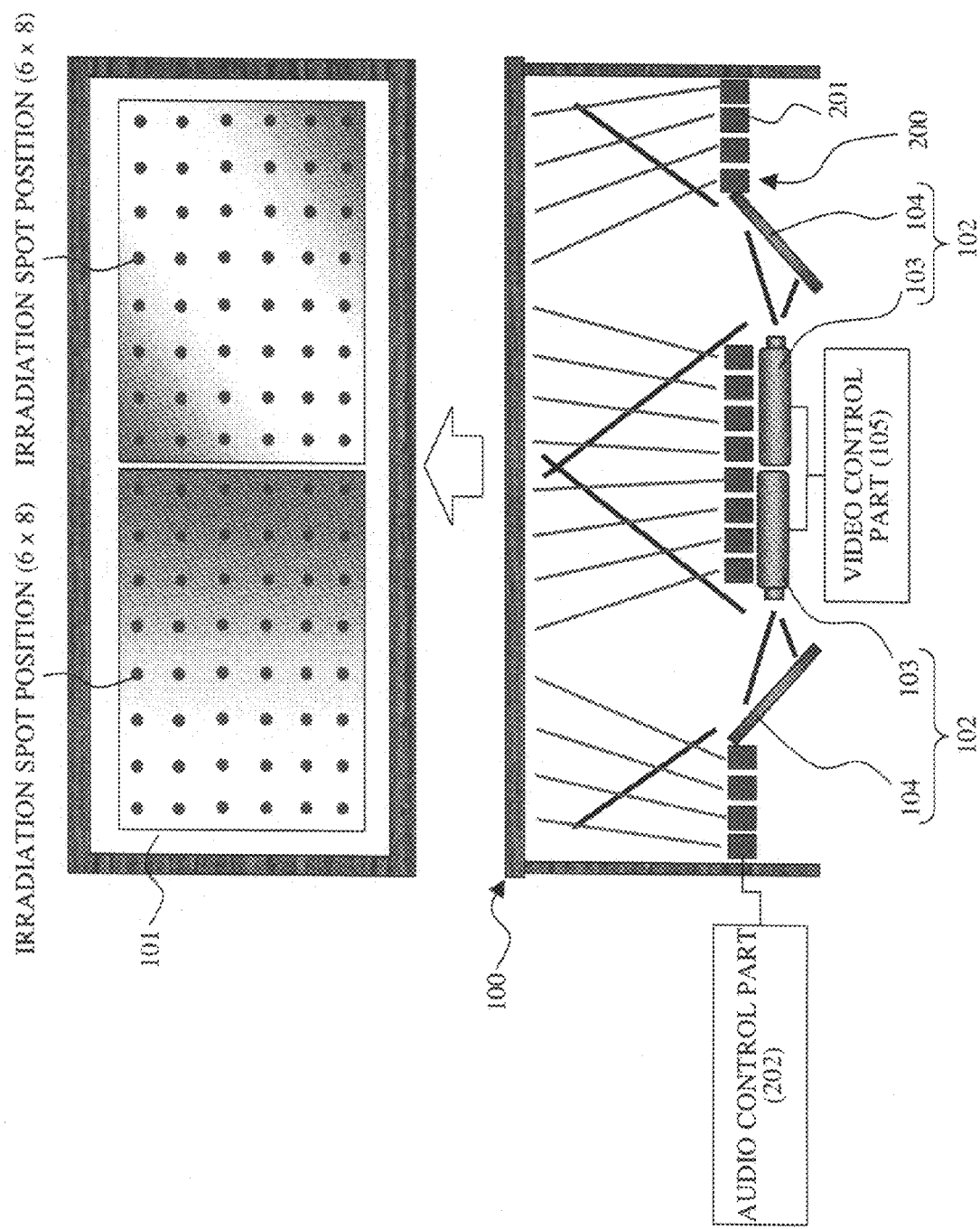
FIG. 12 is a schematic diagram illustrating another embodiment of the invention of the application.

FIGS. 11 and 12 depict an embodiment of the invention of the application.

In the embodiment shown in FIGS. 11 and 12, for the image display device (1), a table (100) serving as the screen means (11) and a projector device (102) serving as the image projecting means (12) are provided.

More specifically, the table (100) has a flat, translucent top screen (101), and the projector device (102) is disposed under the top screen (101) so as to project an image from the side opposite to the image display surface of the top screen (101). In FIG. 11, a single projector device (102) is used to project an image onto the entire surface of the top screen (101). In FIG. 12, two projector devices (102) are disposed, and the top screen (101) is divided into two screens on which are projected respective images. The projector device (102) in FIG. 12 has a projector main body (103) and an optical system (104) comprising for example a mirror which refracts the projected image upward to the back side of the top screen (101).

Then, for the audio output device (2), an infrared light source array (200) formed of multiple infrared light sources (201) serving as the electromagnetic wave irradiating means (22) is disposed under the top screen (101), and an audio control part (202) serving as the modulating means (21).

More specifically, the individual infrared light sources (201) of the infrared light source array (200) are arranged in an array, the light sources corresponding to each of multiple positions in the image shown on the top screen (101), and they irradiate infrared rays modulated by audio information in the audio control part (202) onto each position in the image from the back side of the top screen (101). In FIG. 12, 6×16 spot positions are set in the two divided images shown on the top screen (101) are combined, and 6×16 infrared light sources (201) are arranged corresponding to each of the spot positions. Furthermore, a projection area between light sources is left open so as not to hamper the image projection onto the top screen (101) by the projector devices (102) (the projector main body (103) and the optical system (104)).

The infrared light emitted from this infrared light source (201) is modulated by audio information that is to be outputted by the audio control part (202). More specifically, for example, the drive voltage of the infrared light source (201) is varied in accordance with the voltage level of the audio signal to modulate and control the intensity of outgoing infrared light.

Figure 1:
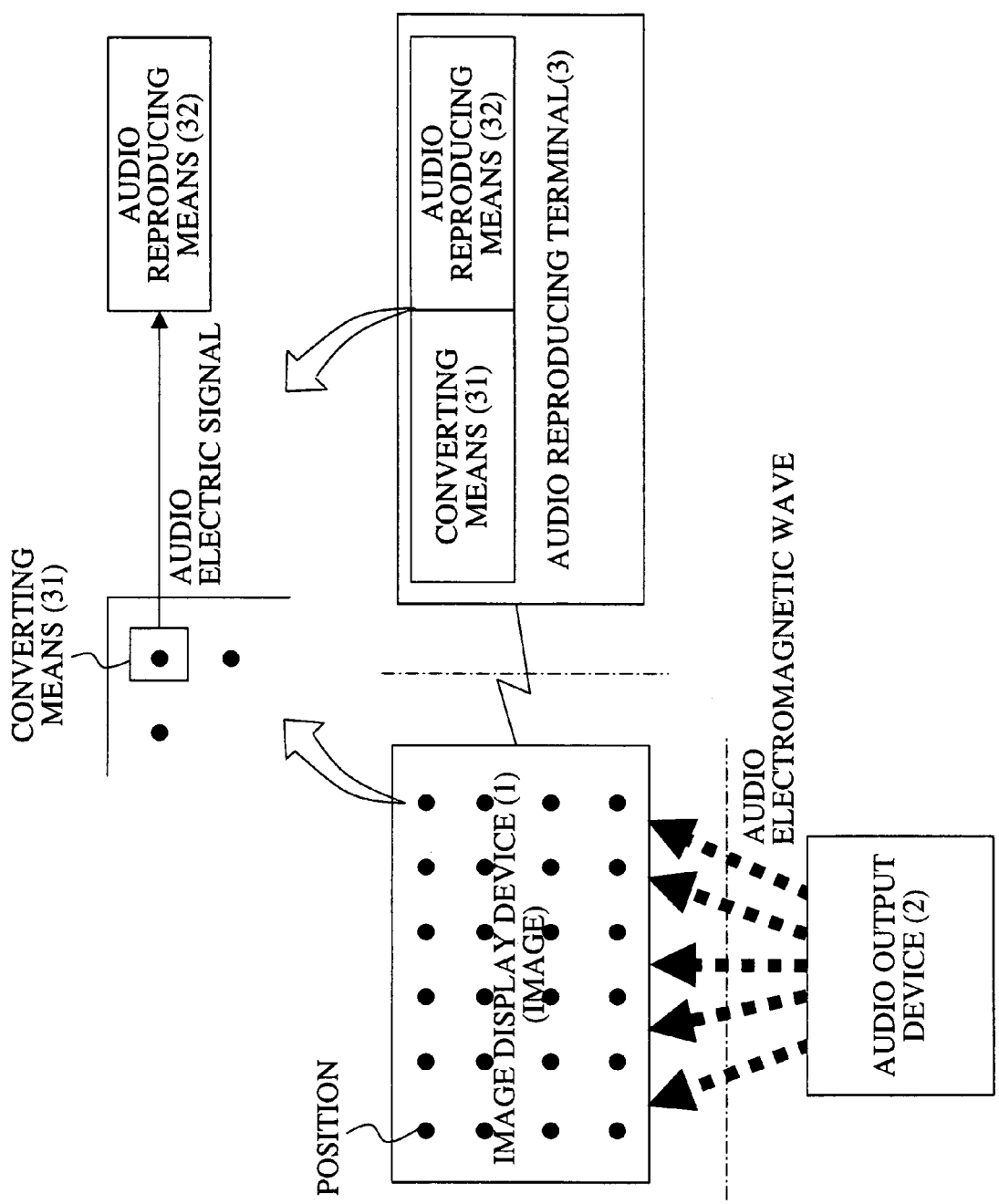
FIG. 1 is a functional block diagram for describing the invention of the application.

Then, as described above, in the state where the projected image from the projector device (102) is shown on the top screen (101) and audio signal modulated infrared light from the infrared light source array (200) is irradiated onto multiple spot positions in the image, the converting means (31) and the audio reproducing means (32) of the audio reproducing terminal (3) (see FIG. 1) are used, and thus the audio signal modulated infrared light is received for photoelectric conversion to reproduce the electric signal to be converted to sound.

In the embodiment, a finger wearable terminal (301) having a solar cell (302) serving as the converting means (31) is worn on the finger of a terminal user (600), and an earphone (300) serving as the audio reproducing means (32) and connected to the solar cell (302) through a cable (not shown) and the like is worn on the terminal user's ear. In this state, when the terminal user (600) brings his/her finger closely to a given spot position in the image, that is, when the solar cell (302) worn on the finger is brought closely to a spot position, the solar cell (302) receives the audio signal modulated infrared light irradiated onto that spot position and converts it to electricity. The resulting electric signal produced by photoelectric conversion is sent to the earphone (300) and outputted as sound, and the terminal user (600) listens to the sound. Of course, the sound is the same as the original audio information.

According to the audio information support system of the embodiment above, multiple terminal users (600) can watch the image shown on the top screen (101) of the table (100), and as well the individual terminal users (600) can listen to their respective preferred audio information relating to the image when the users feel like doing so. Thus, audio information support that separately serves the individual terminal users (600) is implemented.

Second Embodiment

In this audio information support system, in order to still further promote personalization (it may be called privatization) of audio information support for individual users, the system can also be configured to conduct audio information support based on the ID and the position of the terminal user or terminal itself.

Figure 13:
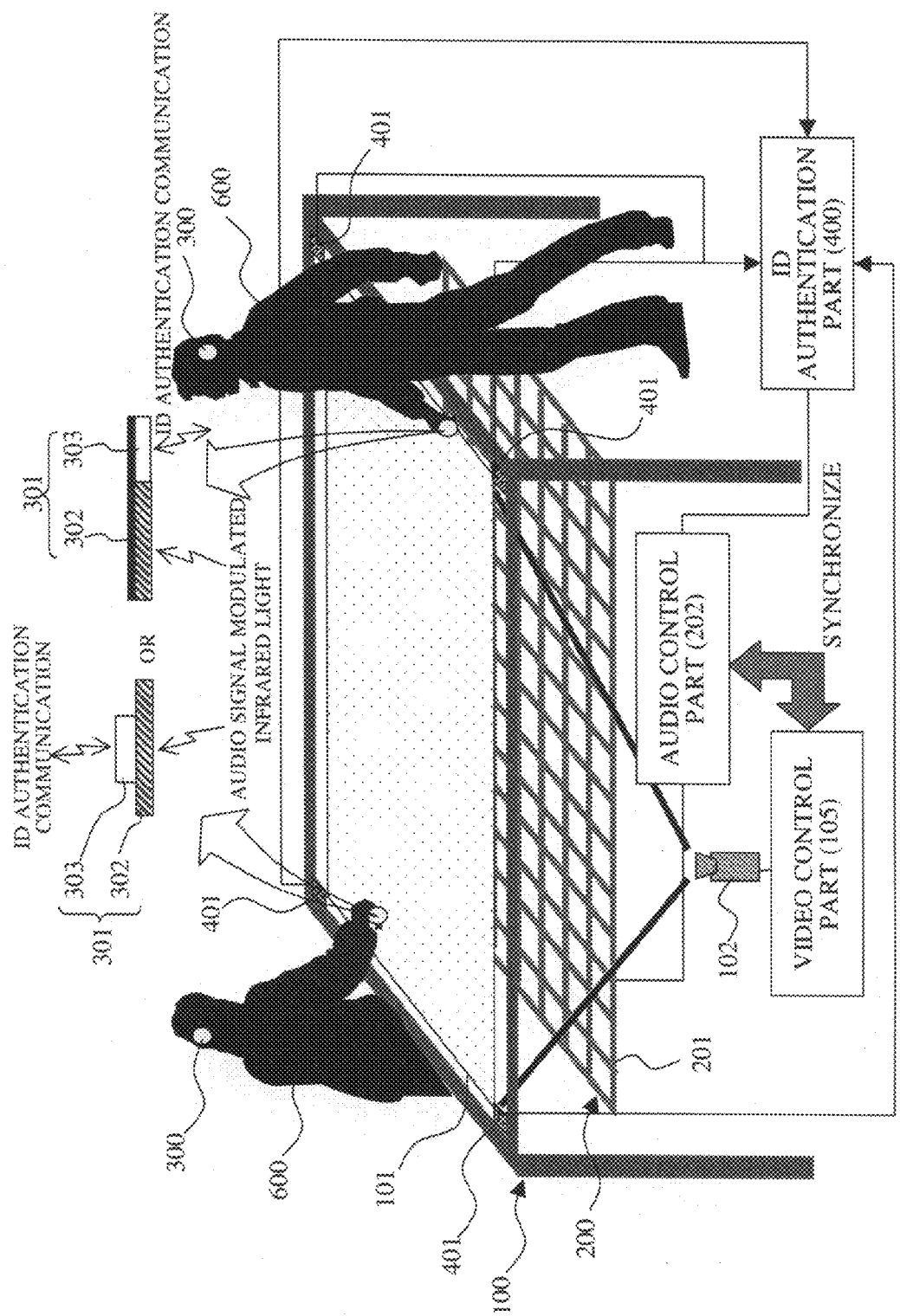
FIG. 13 is a schematic diagram illustrating an embodiment of the invention of the application when ID authentication is conducted.

First, FIG. 13 depicts an embodiment of audio information support based on ID.

Figure 2:
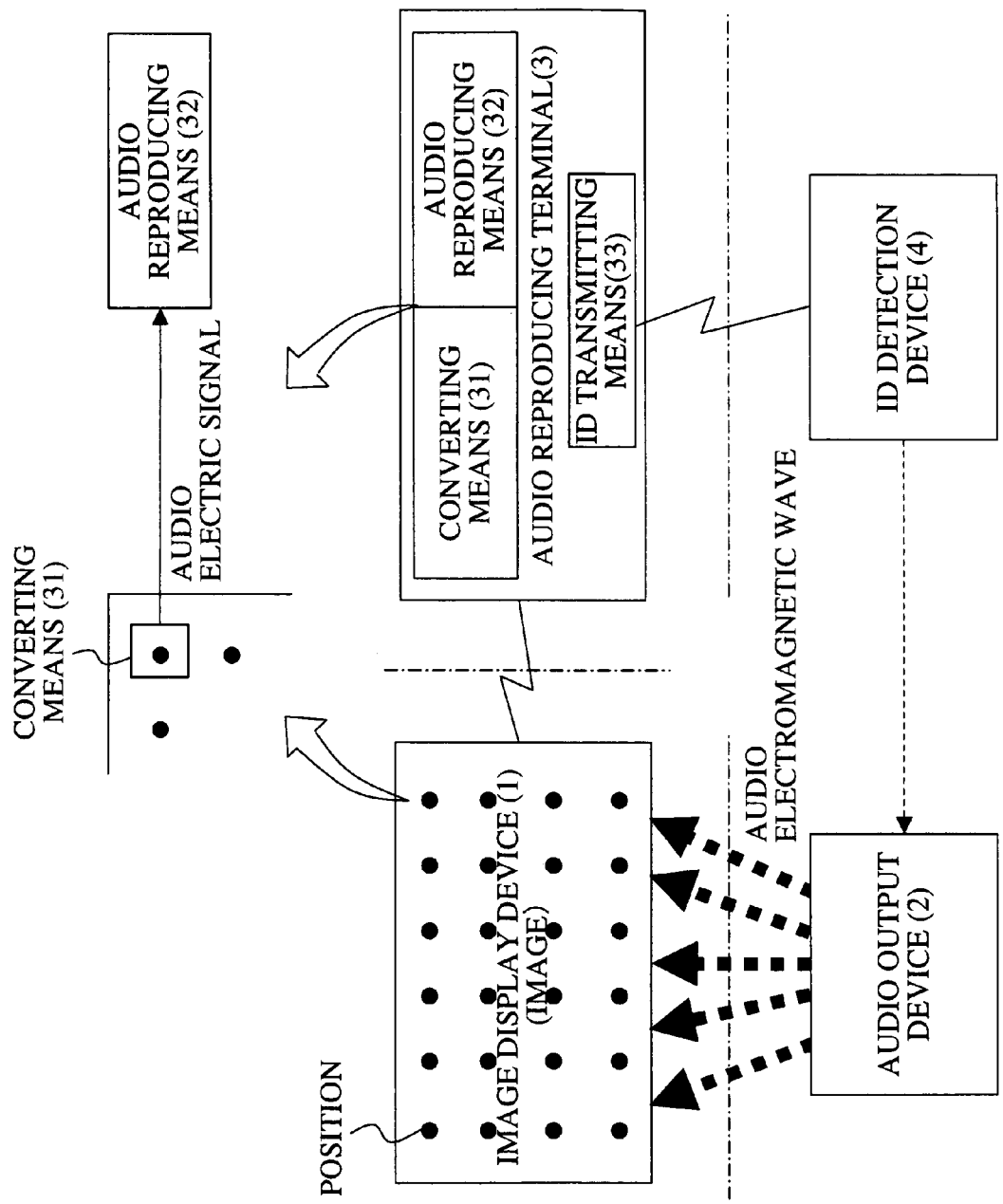
FIG. 2 is a functional block diagram for describing the invention of the application.
Figure 3:
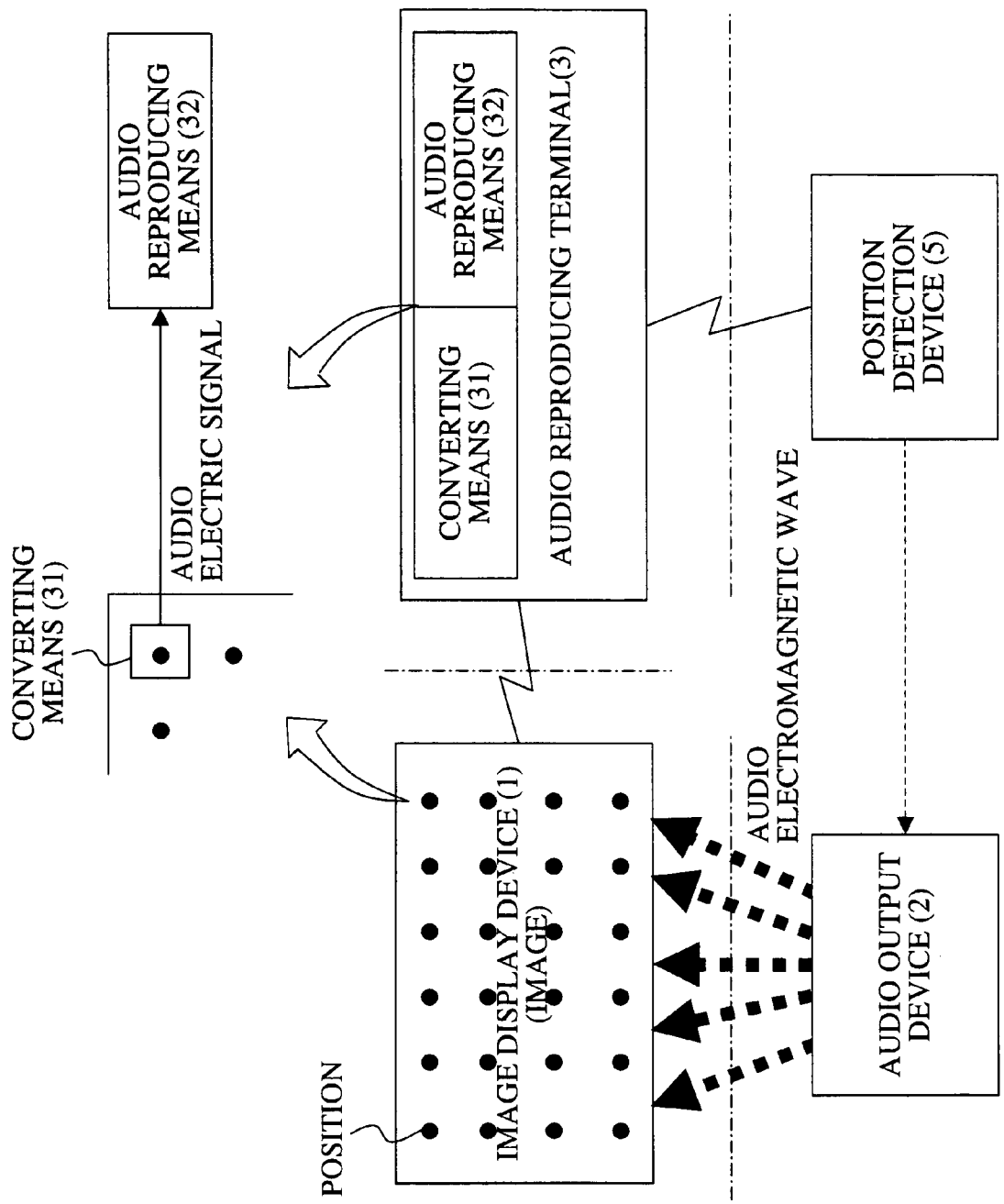
FIG. 3 is a functional block diagram for describing the invention of the application.
Figure 4:
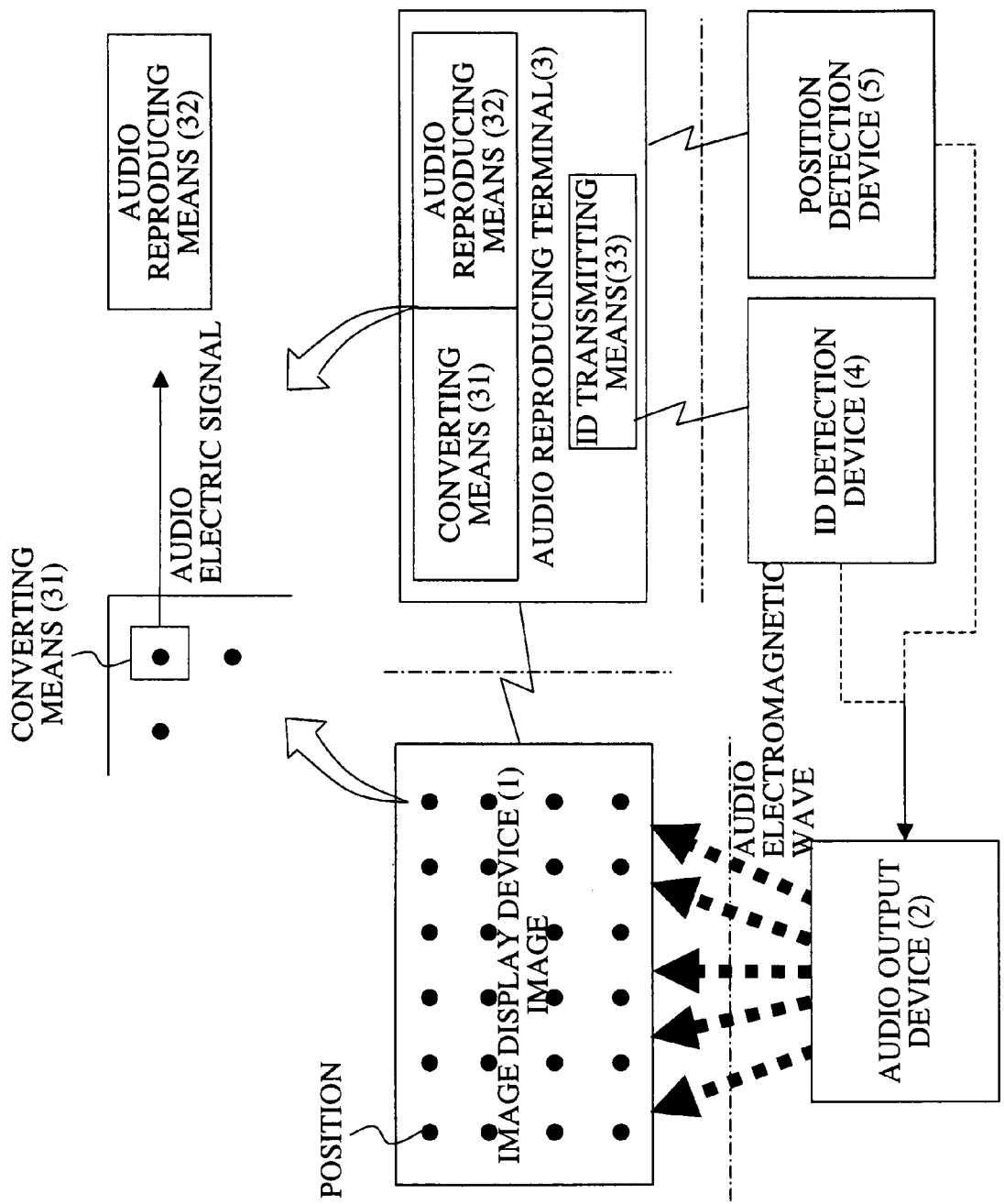
FIG. 4 is a functional block diagram for describing the invention of the application.
Figure 7:
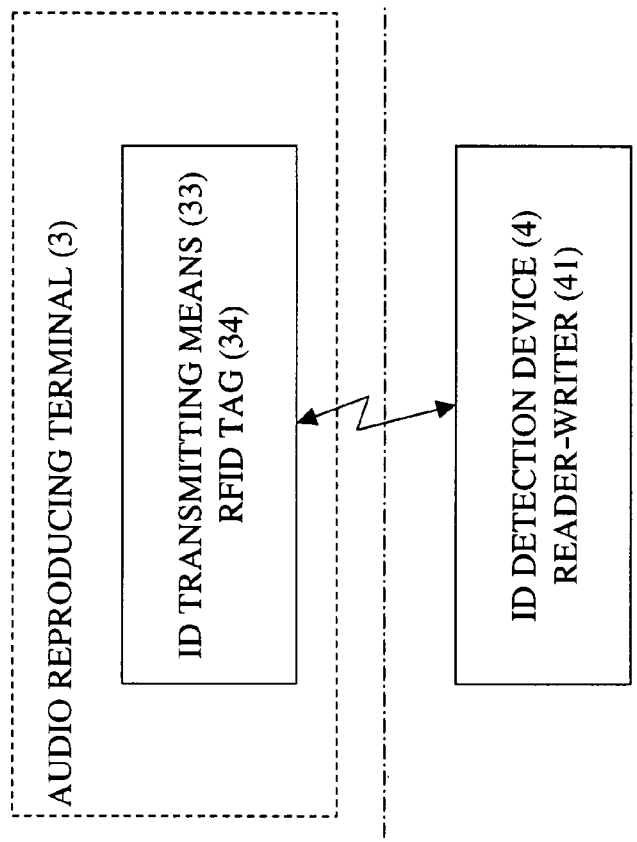
FIG. 7 is a functional block diagram for describing the invention of the application.
Figure 8:
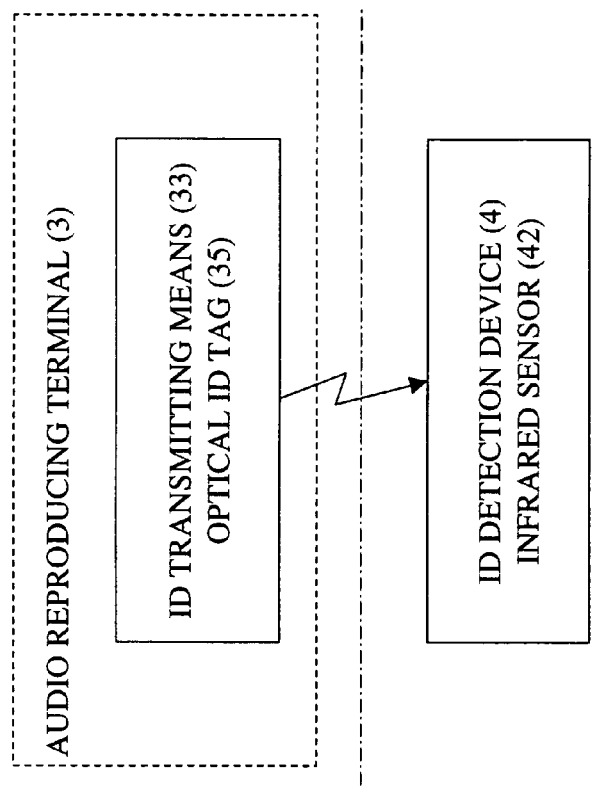
FIG. 8 is a functional block diagram for describing the invention of the application.

In the embodiment shown in FIG. 13, a finger wearable terminal (301) is disposed with an RFID tag (303) serving as the ID transmitting means (33) along with the solar cell (302) (see FIGS. 2 and 7) (see an enlarged conceptual diagram in the drawing). On the other hand, reader-writers (401) are disposed at four corners on the top plate of a table (100) so as not to hamper image display on the top screen (101), and the output of each of the reader-writers (401) is connected to an ID authentication device (400). In the embodiment, the reader-writers (401) and the ID authentication device (400) serve as the ID detection device (4) (see FIGS. 2 and 7). In the finger wearable terminal (301), the solar cell (302) is preferably disposed to have its light receiving surface facing downward in order to receive audio signal modulated infrared light which is irradiated to the back side of the top screen (101) by the infrared light source array (200) below. Moreover, the RFID tag (303) can be disposed either on the side opposite or the side facing the solar cell (302), because in either case it can conduct ID authentication communication with the reader-writer (401) (see the enlarged conceptual diagram in the drawing). When it is disposed on the opposite side, the terminal user (600) can turn the finger wearable terminal (301) upside down above the reader-writer (401).

In this state, when a terminal user (600) brings the RFID tag (303), worn on the finger and serving as the finger wearable terminal (301), close to the reader-writer (401), required data communication is done between the RFID tag (303) and the reader-writer (401) and ID data read by the reader-writer (401) is sent to the ID authentication device (400). Then, it is possible to automatically determine what kind of terminal user (600) is watching the image based on the ID data determined by the ID authentication device (400), and audio information suitable for the terminal user (600) can be transmitted through the audio control part (202) based on the determination.

At this time, for example, when an audio information database which stores audio information corresponding to predetermined ID data and an audio information selecting means which retrieves and selects audio information corresponding to the ID data determined by the ID authentication device (400) from the audio information database is constructed, individual support can be implemented by supplying audio information that is suited only to the terminal user (600) with a particular ID.

Third Embodiment

Figure 14:
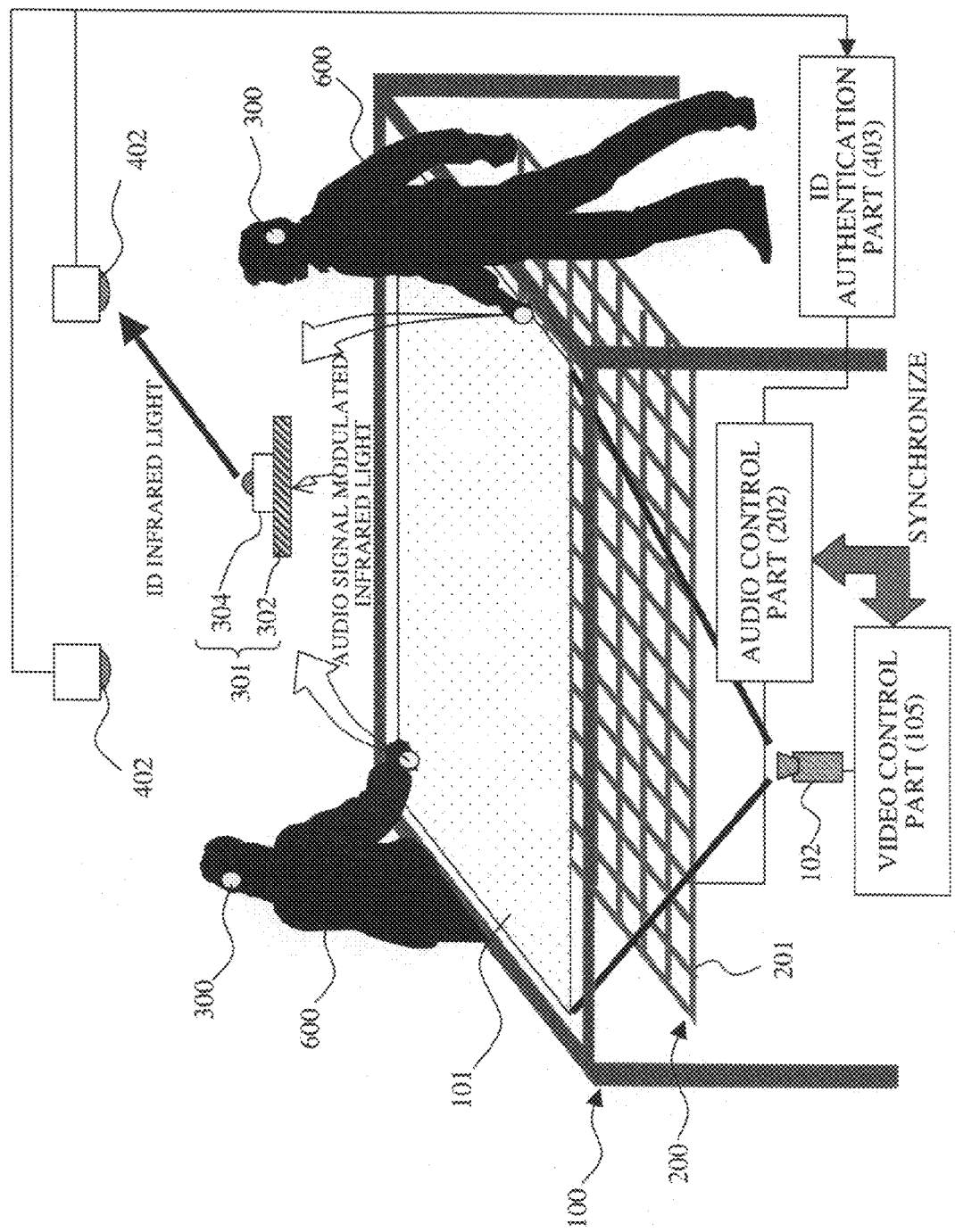
FIG. 14 is a schematic diagram illustrating another embodiment of the invention of the application when ID authentication is conducted.

FIG. 14 is another embodiment of audio information support based on ID.

Figure 9:
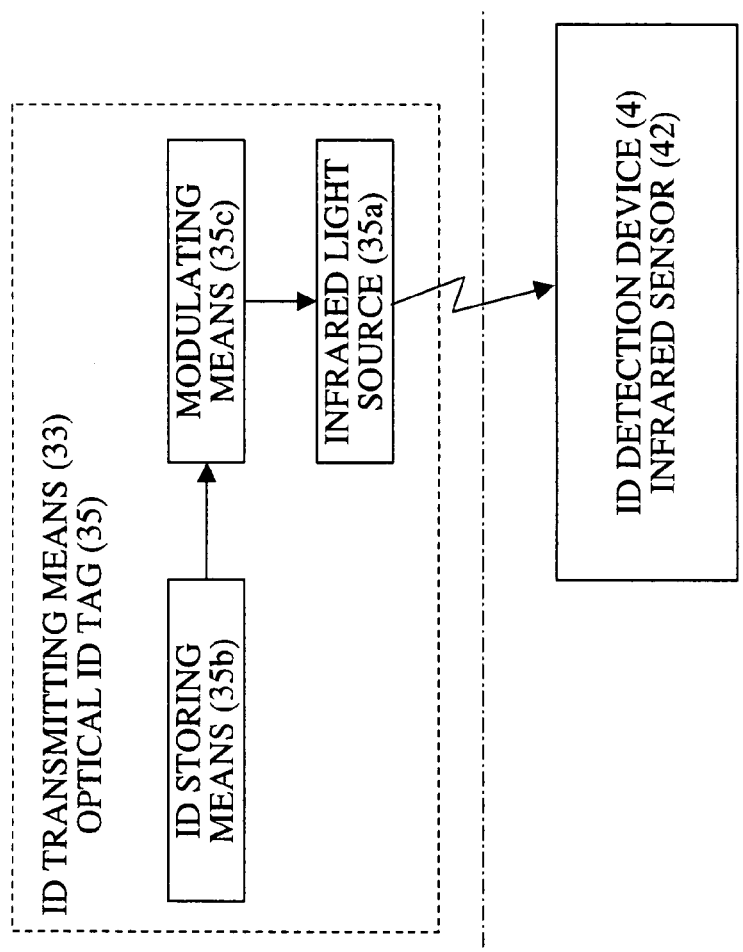
FIG. 9 is a functional block diagram for describing the invention of the application.

In the embodiment, instead of the RFID tag (303) in a finger wearable terminal (301), an optical ID tag (304) is disposed integrally with a solar cell (302) (see the enlarged conceptual diagram in the drawing). As shown in FIG. 9, this optical ID tag (304) has an infrared light source (36a) such as an infrared LED beacon which emits ID infrared light, an ID storing means (35b) such as ID memory which stores ID data, and a modulating means (35c) such as a modulation circuit which modulates infrared light in accordance with ID data. On the other hand, multiple infrared sensors (402) which receive ID infrared light from the optical ID tag (304) and output ID data are disposed above a table (100) at appropriate positions, and the output of each of the infrared sensors (402) is connected to an ID authentication device (400).

In this state, when a terminal user (600) wears the finger wearable terminal (301) on the finger and the optical ID tag (304) emits ID infrared light modulated in accordance with ID data that the tag stores therein, the infrared sensor (402) receives and demodulates the light to take out an ID bit string. After that, similar to the embodiment shown in FIG. 13, the ID authentication device (400) receives the ID bit string, determines the owner of the ID, and audio information suitable only for the terminal user (600) with that ID is transmitted through an audio control part (202).

Fourth Embodiment

Figure 15:
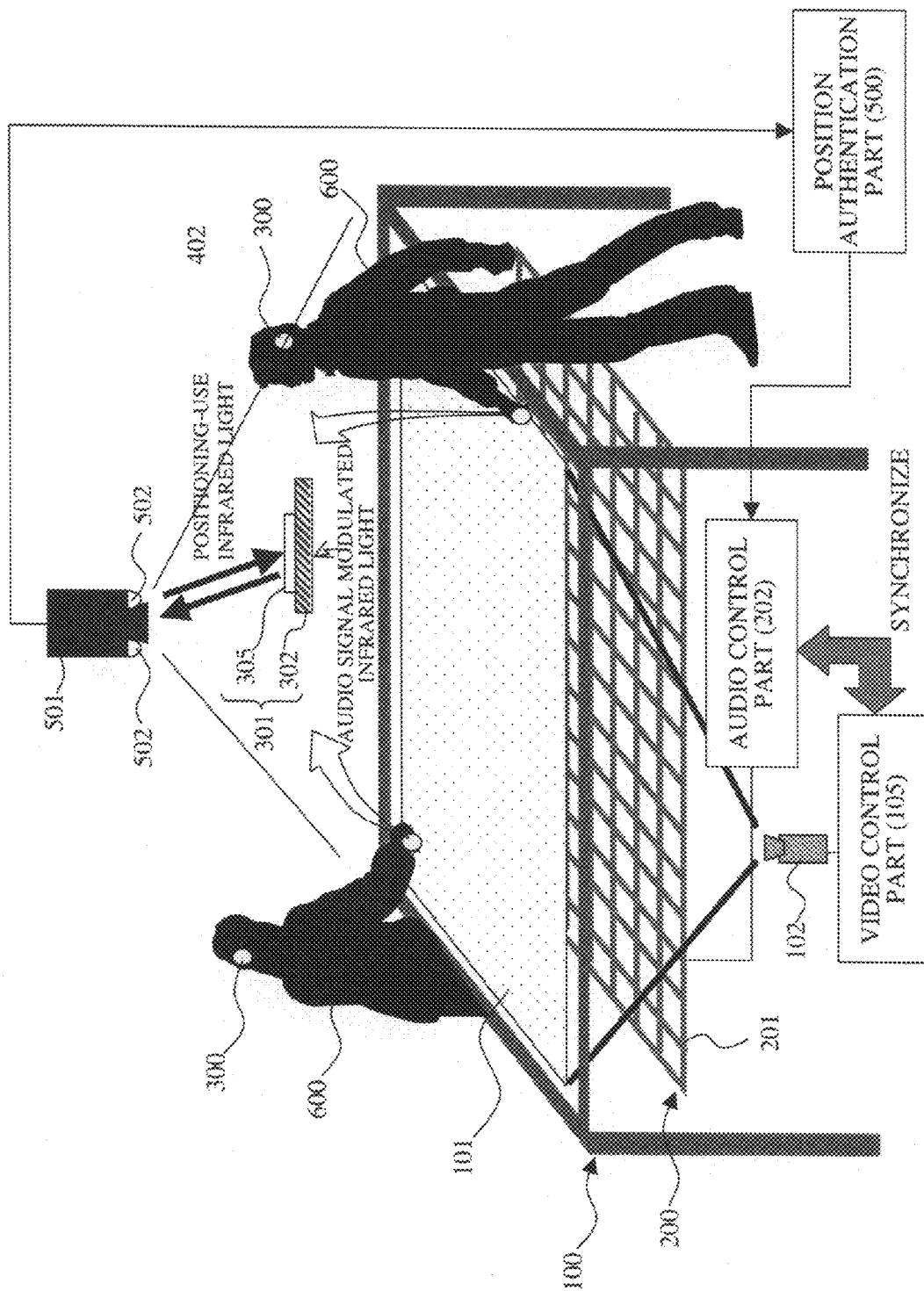
FIG. 15 is a schematic diagram illustrating an embodiment of the invention of the application when position determination is conducted.

Next, FIG. 15 depicts an embodiment of audio information support based on position.

Figure 10:
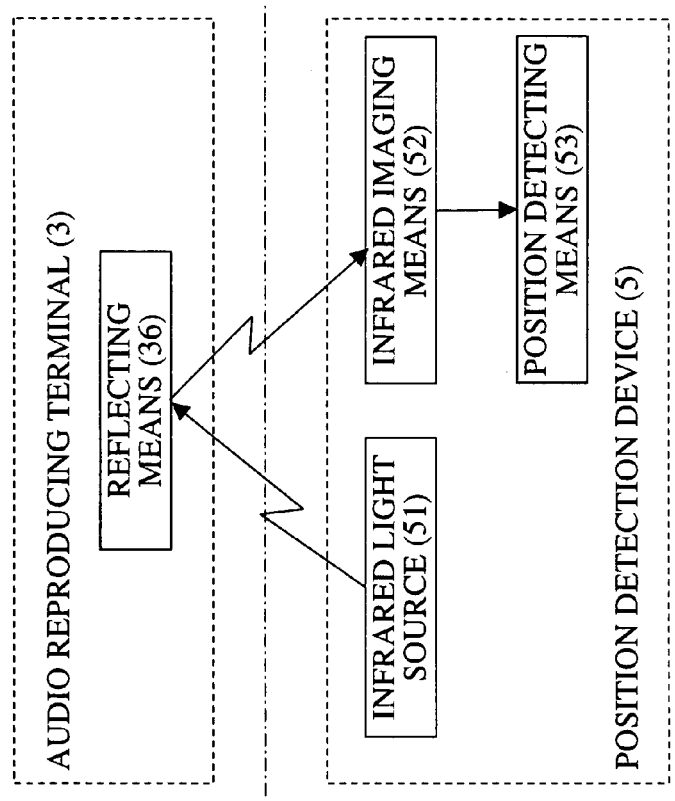
FIG. 10 is a functional block diagram for describing the invention of the application.

In the embodiment, in a finger wearable terminal (301), a retro reflection sheet (305) serving as the reflecting means (36) (see FIG. 10) is disposed integrally with a solar cell (302) (see the enlarged conceptual diagram in the drawing).

On the other hand, a device in which an infrared LED (502) is disposed integrally with an infrared camera (501) is placed at an appropriate position above a table (100). The infrared LED (502) serves as the infrared light source (51) (see FIG. 10) which emits position infrared light, and the infrared camera (501) serves as the infrared imaging means (52) (see FIG. 10) which captures the position of the infrared light reflected back by the reflection sheet (305) of the finger wearable terminal (301). Since the retro reflection sheet (305) is a product which reflects the received light in the same direction as the incident direction, the infrared camera (501) is disposed closely to the infrared LED (502) and formed in one piece in order to accurately capture the infrared light reflected back. Then, the output of the infrared camera (501) is connected to a position determination device (500) serving as the position detecting means (53) (see FIG. 10) which detects the position of an audio reproducing terminal (3) based on the infrared light image taken by the infrared camera (501). The position determination device (500) may be incorporated in one housing with the infrared camera (501) and the infrared LED (502), or disposed separately.

In this state, positioning-use infrared light is always emitted from the infrared LED (502) onto nearly the entire surface of the top screen (101). When the finger wearable terminal (301) enters this emission area, that is, when a terminal user (600) brings the finger wearable terminal (301) worn on his/her finger above the top screen (101), the retro reflection sheet (305) receives and reflects the position infrared light in almost the same direction as the incident direction. The reflected infrared light returns to the infrared camera (501). The infrared camera (501) shoots the position infrared light as a bright spot through a visible light cutoff filter, and the position determination device (500) receives the image data and detects the relative position of the bright spot from frame coordinates by image processing. This detected position is determined as the position of the finger wearable terminal (301) above the top screen (101), and it can be automatically determined at which position in the image the finger wearable terminal (301) is located now. The coordinates of the position on the top screen (101) onto which each of the infrared light sources in the array (200) irradiates audio signal modulated infrared light is stored in an audio control part (202) beforehand, the light source matched with the position coordinates of the finger wearable terminal (301) are selected from the light source coordinates, and audio signal modulated infrared light is emitted onto the selected screen position. In this way, audio information can be transmitted to the position in the image of the finger wearable terminal (301), that is, where the terminal user (600) is pointing.

In addition, the retro reflection sheet (305) can be configured from multiple retro cube corner reflectors arranged in a sheet. Preferably, in order to receive positioning-use infrared LED (502) light emitted from above as described above, the retro reflection sheet is disposed on the side opposite the solar cell (302) which receives audio signal modulated infrared light emitted from below by the infrared light source array (200), that is, the light receiving surface is directed upward.

Fifth Embodiment

In this audio information support system, still better individual audio information support is implemented by combining audio information support based on ID with audio information support based on position.

Figure 16:
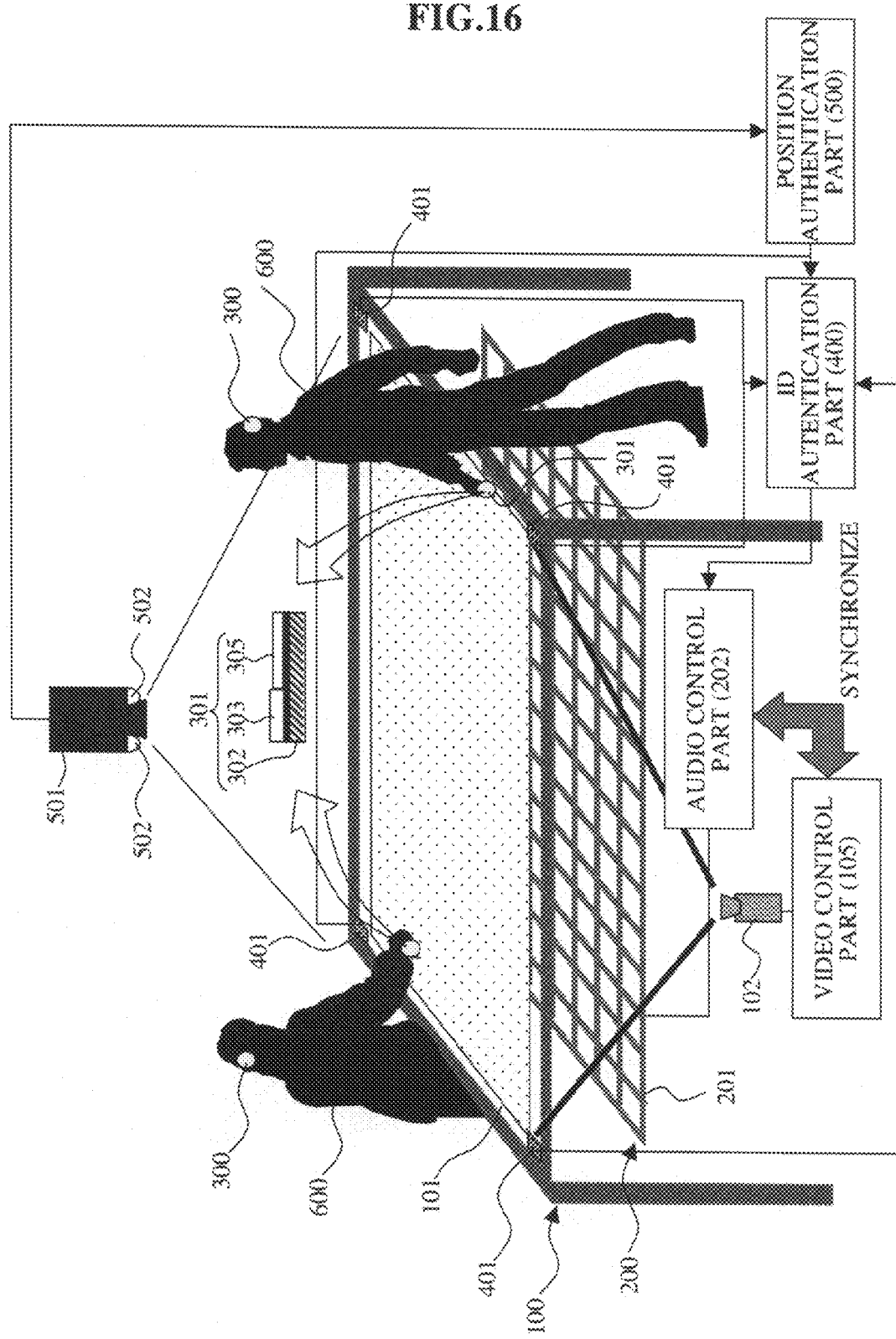
FIG. 16 is a schematic diagram illustrating an embodiment of the invention of the application when ID authentication and position determination are conducted.
Figure 17:
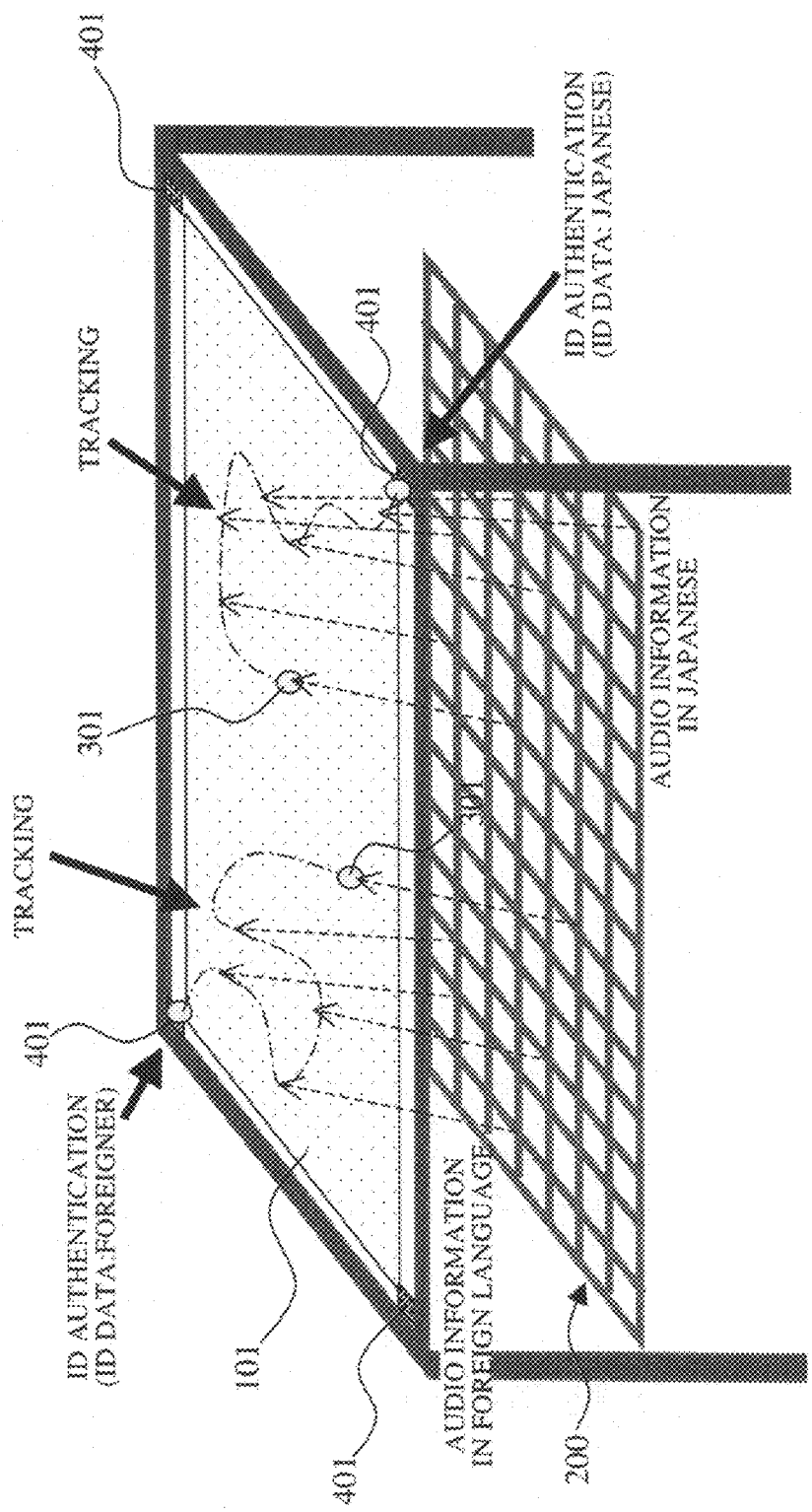
FIG. 17 is a diagram for describing an embodiment shown in FIG. 16.

FIG. 16 depicts an embodiment in which the embodiments shown in FIGS. 13 and 15 are combined to conduct audio information support based on both ID and position. FIG. 17 is a conceptual diagram for describing the embodiment, referred to in the description below.

In the embodiment, first, positioning-use infrared light is always emitted from an infrared LED (502), it is reflected back toward an infrared camera (501) by a reflection sheet (305) of a finger wearable terminal (301) placed above a top screen (101) and captured, and a position determination device (600) conducts position determination based on image data. More specifically, as long as the reflected position infrared light is captured, the finger wearable terminal (301) can be tracked (see FIG. 17).

On the other hand, when a terminal user (600) brings an RFID tag (303) of the finger wearable terminal (301) close to one reader-writer (401) on the top plate, ID authentication is conducted as described above. At this time, the position coordinates of the finger wearable terminal (301) detected and determined by the infrared camera (501) and the position determination device (500) are matched with the position coordinates of the reader-writer (401). Therefore, when the position coordinates of placing the reader-writer (401) are stored beforehand, it can be automatically determined which reader-writer (401) has done ID authentication, and the finger wearable terminal (301) being tracked can be matched with ID data (see FIG. 17).

Then, audio information corresponding to the ID authentication data is retrieved and selected, and infrared light modulated by this data is emitted onto the position in the image matched with the position coordinates of the determined finger wearable terminal (301). Thus, audio information suited particularly to the terminal user (600) and to the position in the image that the terminal user (600) is now interested in can be sent to that position, and individual appropriate audio information support can be conducted all the time that the finger wearable terminal is tracked (301) (see FIG. 17).

In one example of the embodiment shown in FIG. 17, when it is determined that one person is Japanese and another one is a foreigner by ID authentication, both are tracked from the positions of the reader-writers (401) that have made ID authentication (ID authentication may be synchronized with the start of tracking (the start of photographing)). Audio information in Japanese is offered for the Japanese all the time while the finger wearable terminal (301) is moving over the top screen (101), at any spot positions in the image, whereas audio information in a foreign language is offered for the foreigner similarly.

Sixth Embodiment

Figure 18:
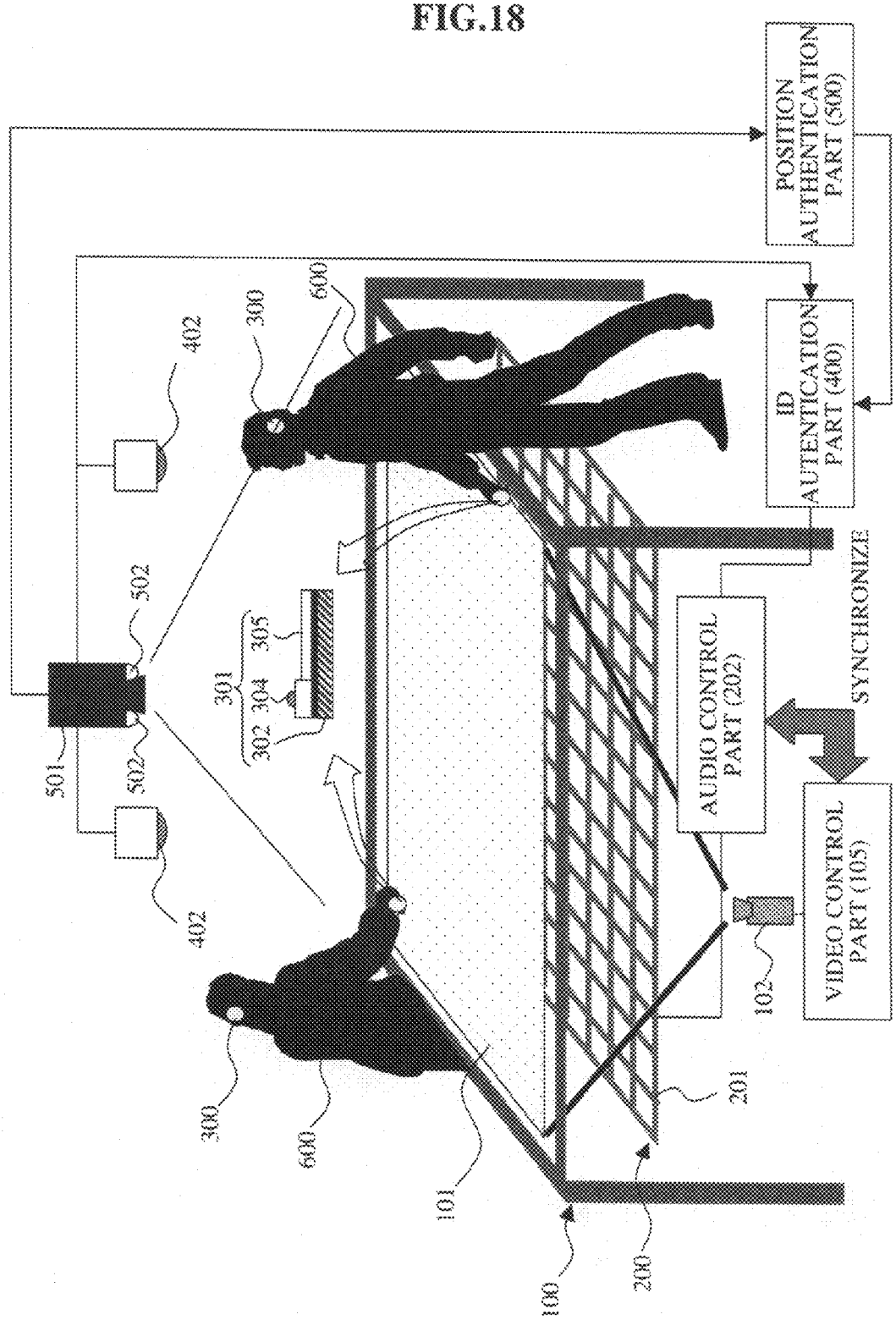
FIG. 18 is a schematic diagram illustrating another embodiment of the invention of the application when ID authentication and position determination are conducted.

FIG. 18 depicts an embodiment that combines the embodiments shown in FIGS. 14 and 15 to conduct audio information support based on both ID and position.

In the embodiment, a finger wearable terminal (301) first intermittently emits ID infrared light from an optical ID tag (304) at predetermined time intervals. The ID infrared light reaches two different sensors, that is, an infrared sensor (402) and an infrared camera (501) through separate paths. The infrared sensor (402) demodulates the ID infrared light as described above to detect an ID bit string, and an ID authentication device (400) conducts ID authentication. The infrared camera (501) captures the ID infrared light as a bright spot through a visible light cutoff filter, and a position determination device (500) conducts position determination. At this time, since infrared light emission is repeated at preset time intervals, the output timing can be known from changes in the bright spot. More specifically, the output of the infrared sensor (402) can be synchronized with the camera image by the infrared camera (501).

Also, as described above, the infrared LED (502) emits positioning-use infrared light all the time, a reflection sheet (305) of the finger wearable terminal (301) when above the top screen (101) reflects back the light to the infrared camera (501), and the position determination device (500) conducts position determination based on the taken data. The positioning-use infrared light, that is, the bright spot of the reflection sheet (305), is hard to lose, in contrast to the ID infrared light, and thus the position of the reflection sheet (305), that is, the position of the finger wearable terminal (301) can be followed all the time. Therefore, when the bright spot of the optical ID tag (304) appears near the bright spot of the reflection sheet (305), the ID determined by the infrared sensor (402) and the ID authentication device (400) can be associated with the position determined by the infrared camera (501) and the position determination device (500). More specifically, ID information that is intermittently detected can be associated with position information while the finger wearable terminal (301) is being tracked all the time.

Then, audio information corresponding to the determined ID is retrieved and selected, and infrared light modulated by that information is emitted to the position in the image matching the position coordinates of the target finger wearable terminal (301). Thus, audio information specifically suited to the terminal user (600) and to the image that user is now interested in is transmitted toward the position of the user, and individual audio information support can be adequately conducted all the time the finger wearable terminal (301) is tracked.

Seventh Embodiment

Also, for position determination, a touch panel may be used in addition to the RFID tag (303) and the optical ID tag (304).

Figure 19:
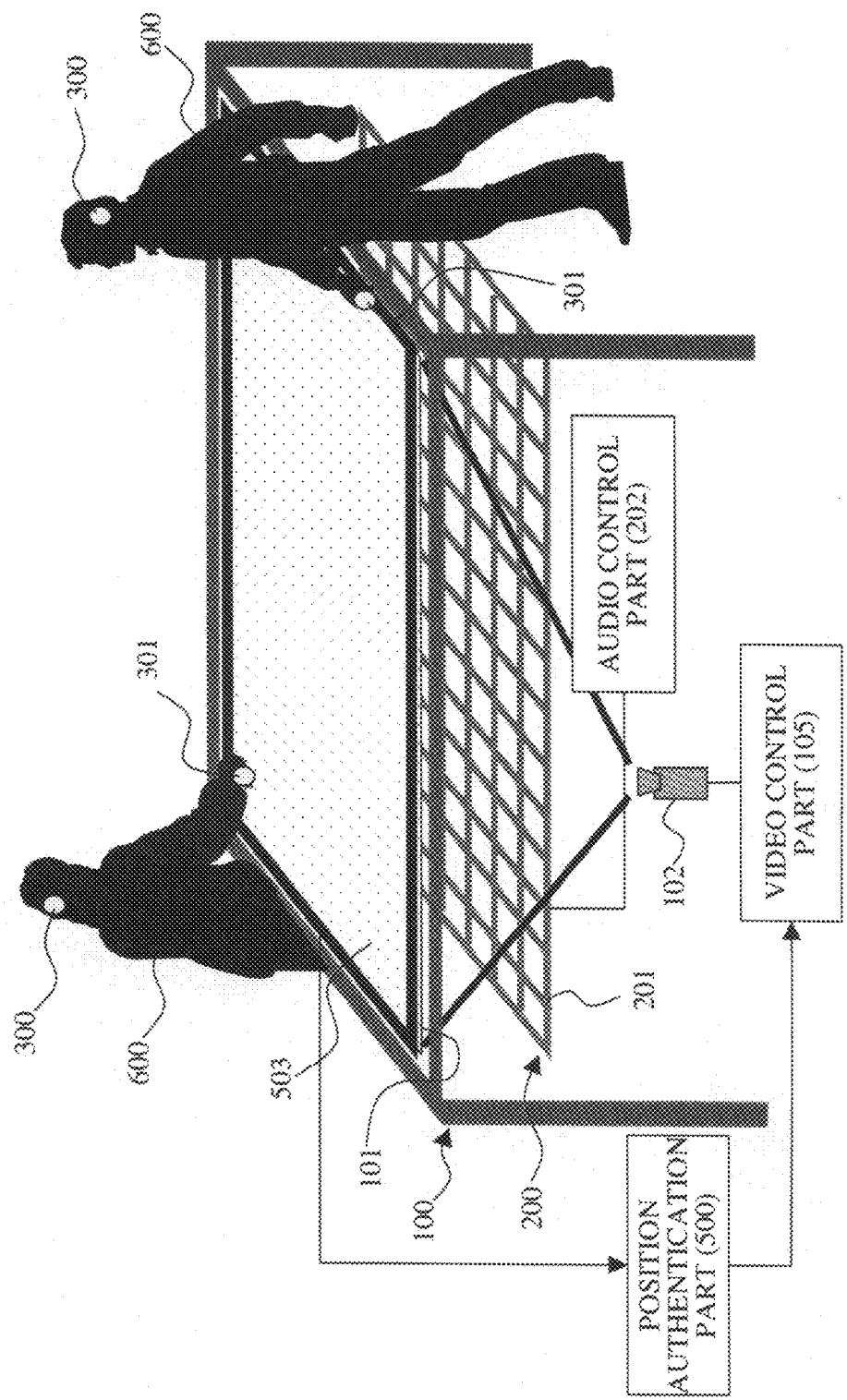
FIG. 19 is a schematic diagram illustrating still another embodiment of the invention of the application for position determination.

FIG. 19 depicts an embodiment that conducts audio information support based on position determination using the touch panel.

In the embodiment, a touch panel (503) is disposed on a top screen (101) of a table (100). The touch panel (503) is transparent so as to make visible an image shown on the top screen (101) to a terminal user (600) through the touch panel (503).

In this state, when the terminal user (600) touches the touch panel (503), the position touched is detected and set to be the position of a finger wearable terminal (301).

After that, irradiation position coordinates of audio signal modulated infrared light are determined so as to match the touched position coordinates, and thus individual audio information support can be conducted toward the matched irradiation position. Of course, it is needless to say that it can be combined with the above ID authentication process.

Other Embodiments

The invention of the application is not limited to the embodiments above, and various other forms are feasible.

[1] For example, in the embodiments shown in FIGS. 11 to 19, the table (100) having the flat top screen (101) is used for the screen means (11) of the image display device (1), but a curved screen also can be used. In this case, for example, an image may be projected onto a spherical or half spherical screen or the like, from the back side.

Figure 20:
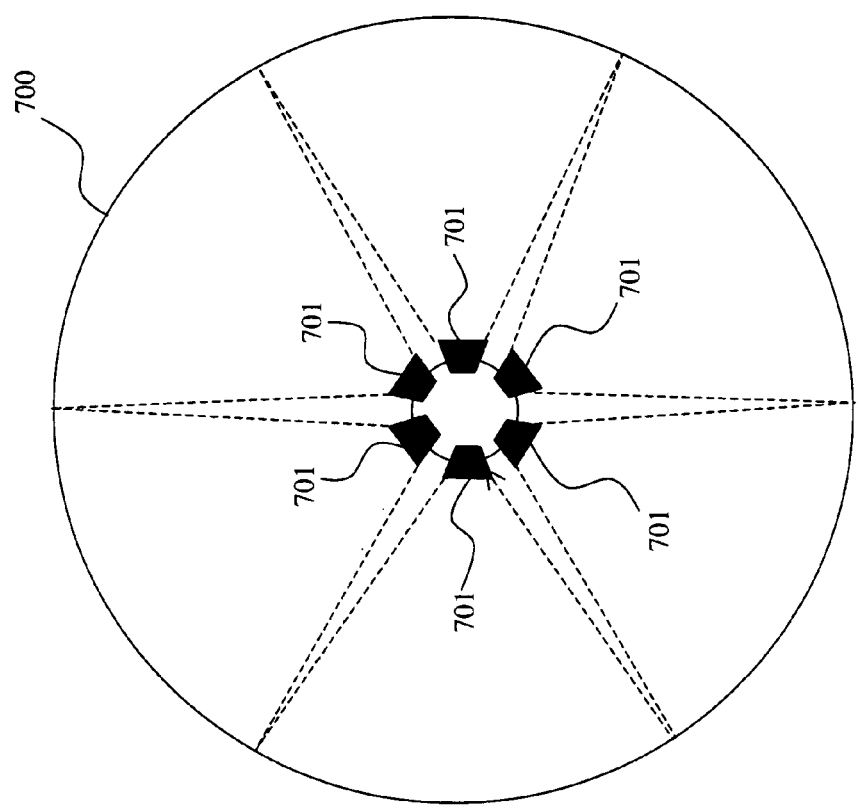
FIG. 20 is a schematic diagram illustrating an example when a spherical screen is used.

FIG. 20 depicts an example of a translucent spherical screen (700) and projector devices (701). Multiple projector devices (701) are placed inside the 360-degree spherical screen (700), and each of the projector devices (701) projects an image to an assigned section of the sphere. In this case, an appropriate number of the infrared light sources (201) is placed at appropriate positions so as to irradiate audio signal modulated infrared light onto appropriate spot positions in the image.

Figure 5:
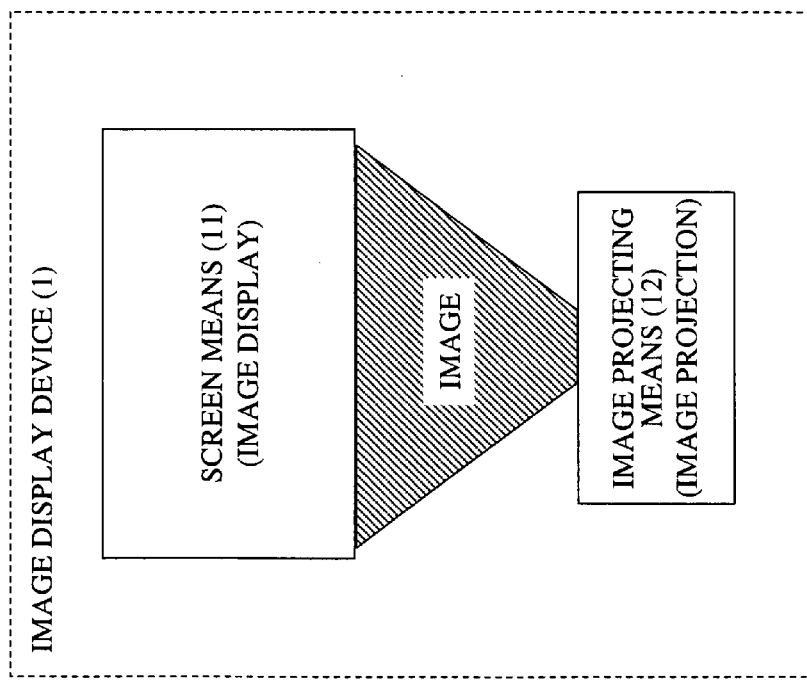
FIG. 5 is a functional block diagram for describing the invention of the application.
Figure 6:
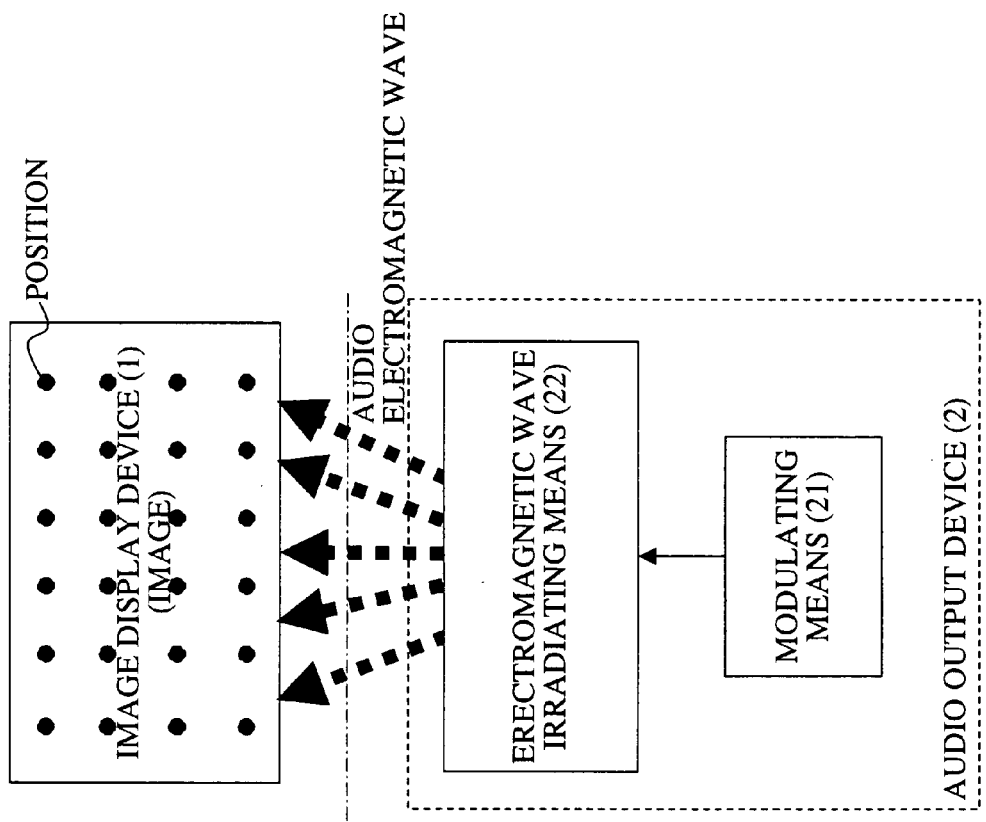
FIG. 6 is a functional block diagram for describing the invention of the application.

[2] Furthermore, the embodiments shown in FIGS. 11 to 19 are configured for the image display device (1) comprising the screen means (11) and the image projecting means (12) (see FIG. 5). However, for the image display device (1), various other devices can be used instead, including a cathode-ray tube display (=CRT display), and a flat panel display (=FPD) such as a liquid crystal display (=LCD), a plasma display (=PDP), an electroluminescent display (=ELD), a light-emitting diode display (=LED display), a vacuum fluorescent display (=VFD), and an electrolytic emission display (FED). In any of using these display devices, audio signal modulated electromagnetic waves typified by the audio signal modulated infrared light are emitted onto the appropriate position on the image display surface.

Figure 21:
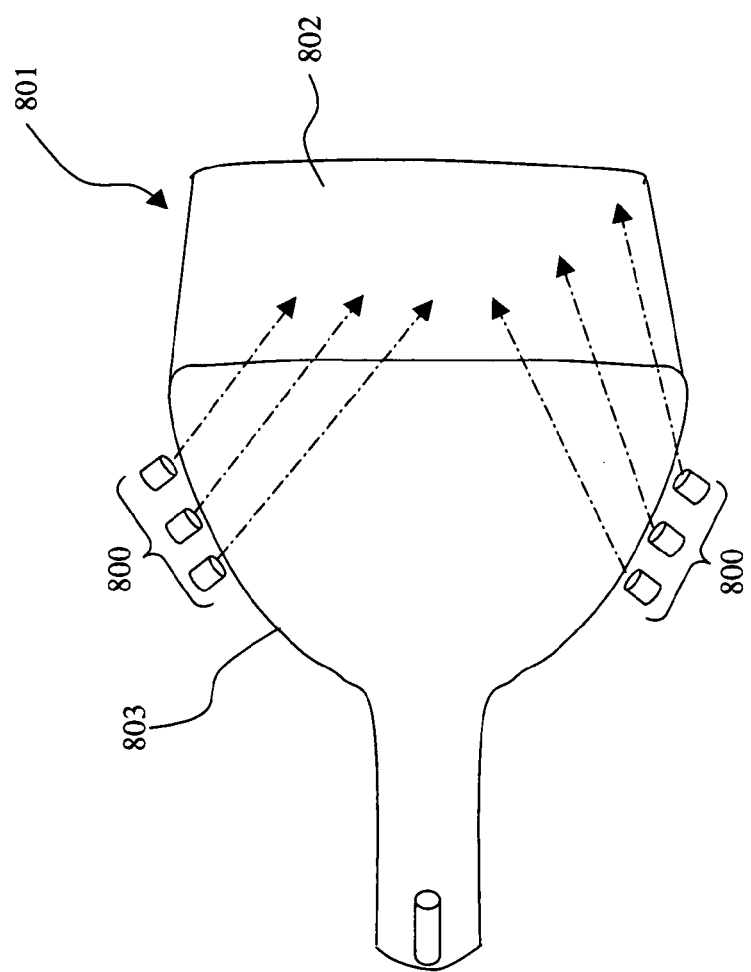
FIG. 21 is a schematic diagram illustrating an example when a cathode-ray tube display is used.

FIG. 21 depicts an example of the cathode-ray tube display (801) and infrared light sources (800). In this case, an appropriate number of the infrared light sources (800) is placed at appropriate positions outside a cathode-ray tube (803) so as to transmit infrared light through the fluorescent screen (802) of the cathode-ray tube display (801) and emit audio signal modulated infrared light onto the appropriate spot positions in the image. At this time, since the cathode-ray tube (803) is typically given external and internal coatings, it is necessary that the coating where infrared light passes be removed, or that an infrared light transmissive material is used for the coating so that sufficient infrared light passes through both coatings. Of course, the invention is not limited to the example shown in FIG. 21.

Figure 22:
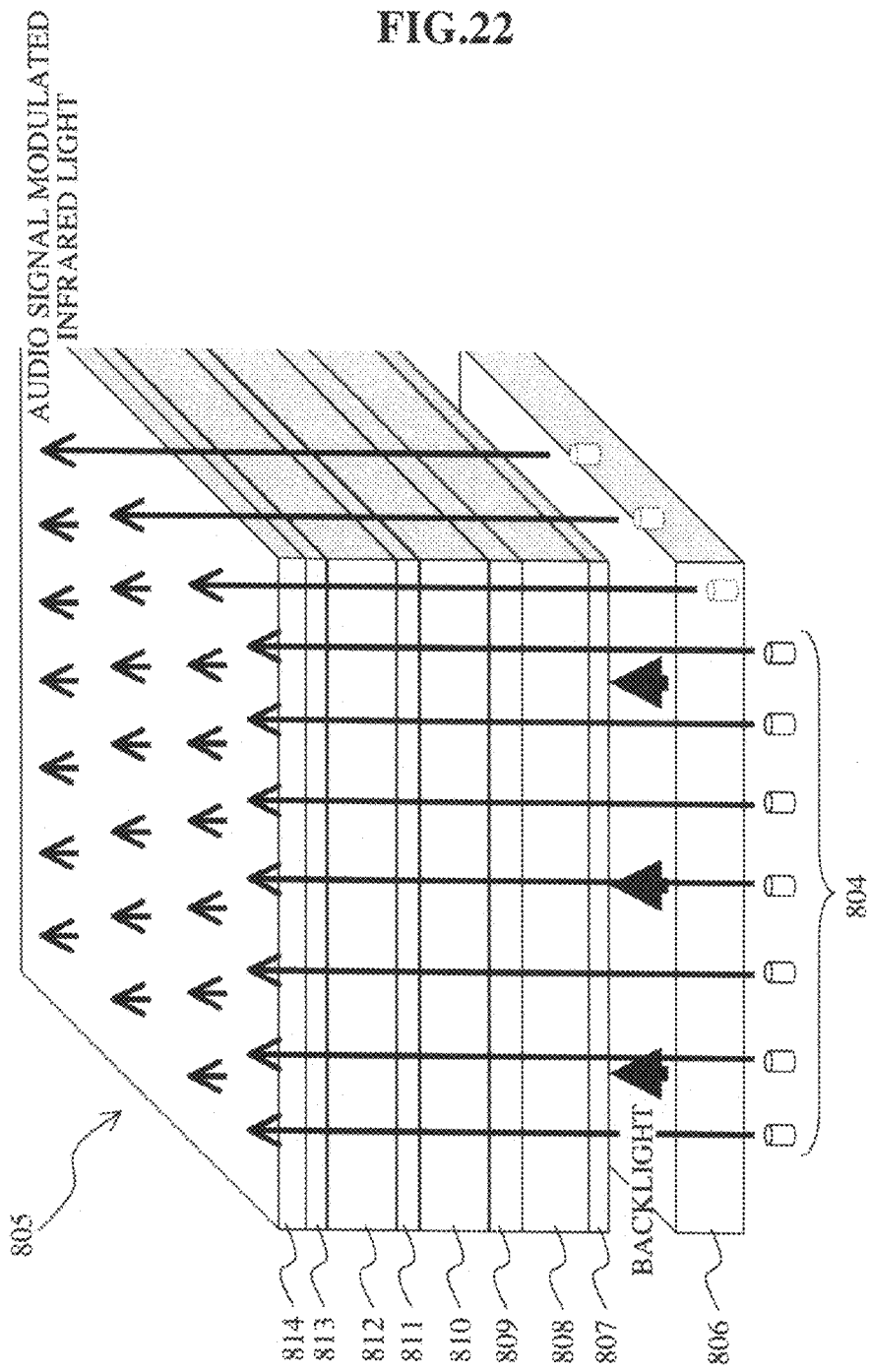
FIG. 22 is a schematic diagram illustrating an example when a liquid crystal display is used.

FIG. 22 depicts an example of a transparent liquid crystal display (805) and infrared light sources (804). In FIG. 22, (806) denotes a backlight source, (807) denotes a polarizing filter, (808) denotes a glass substrate, (809) denotes a transparent electrode, (810) denotes a liquid crystal layer, (811) denotes a color filter, (812) denotes a glass substrate, (813) denotes a polarizing filter, and (814) denotes a display surface. In this case, an appropriate number of infrared light sources (804) is placed at the positions where light will pass through each layer and emit audio signal modulated infrared light onto appropriate spot positions on the display surface (814). It is acceptable that an infrared light transparent material is used at appropriate portions of each layer. Of course, the invention is not limited to the example shown in FIG. 22.

Figure 23:
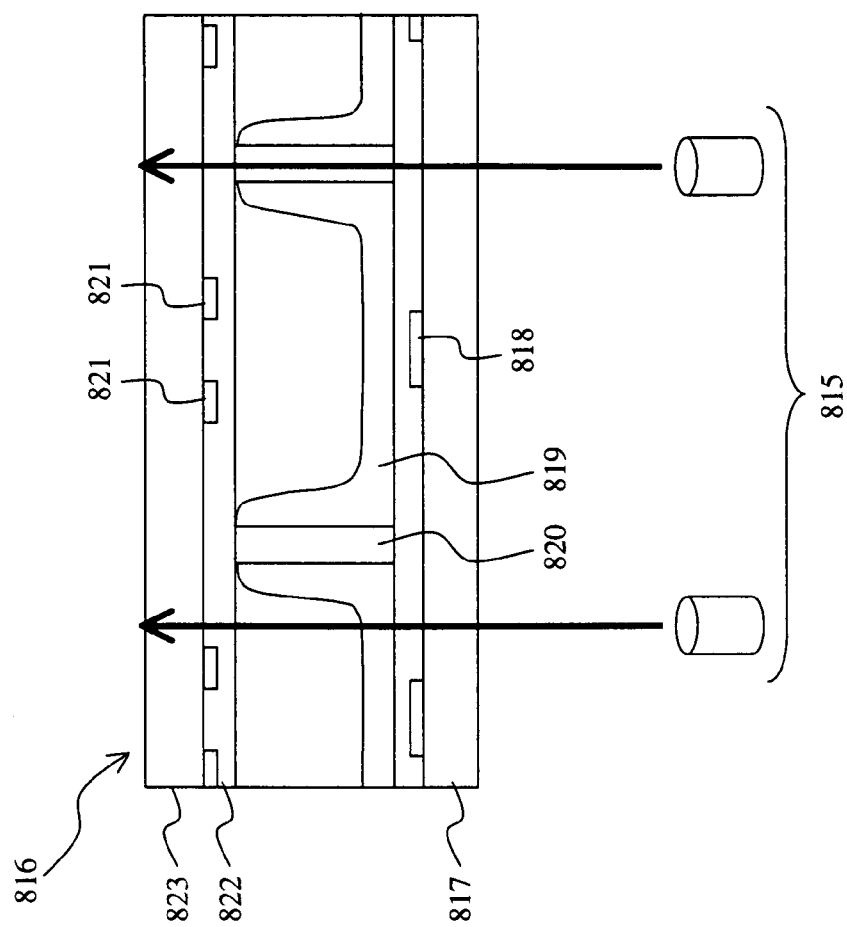
FIG. 23 is a schematic diagram illustrating an example when a plasma display is used.

FIG. 23 depicts an example of a plasma display (816) and infrared light sources (815). In FIG. 23, (817) denotes a glass substrate on the back side, (818) denotes an address electrode (it is also called a data electrode), (819) denotes a fluorescent material, (820) denotes a barrier rib, (821) denotes a display electrode (a pair consisting of a scanning electrode and a sustain electrode), (822) denotes a dielectric layer, and (823) denotes a front glass substrate. In this case, an appropriate number of the infrared light sources (815) is placed at appropriate positions so as to transmit audio signal modulated infrared light through each layer and onto appropriate spot positions on the glass substrate (823) on which an image is shown. It is acceptable that an infrared light transmissive material is used at appropriate portions of each layer. Of course, the invention is not limited to the example shown in FIG. 23.

Figure 24:
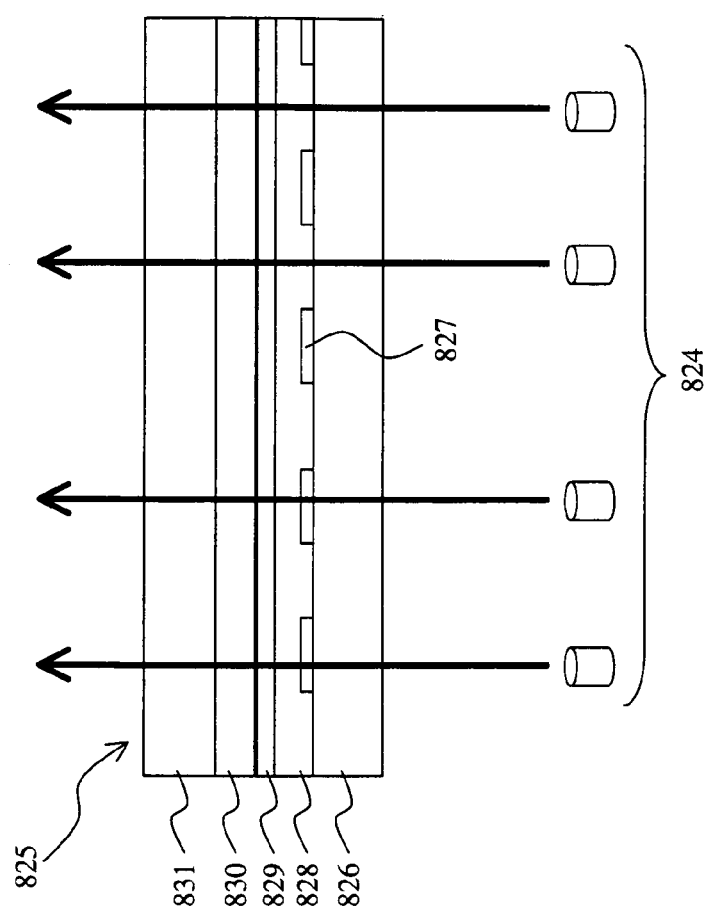
FIG. 24 is a schematic diagram illustrating an example when an electroluminescent display is used.

FIG. 24 depicts an example of a transparent electroluminescent display (825) and infrared light sources (824). In FIG. 24, (826) denotes a glass substrate, (827) denotes a transparent electrode, (828) denotes an insulating layer, (829) denotes a light emitting layer, (830) denotes an insulating layer, and (831) denotes a glass substrate. In this case, it is fine that an appropriate number of the infrared light sources (824) is placed at appropriate positions so as to transmit audio signal modulated infrared light onto appropriate spot positions on the glass substrate (831). It is acceptable that an infrared light transmissive material can be used at appropriate portions of each layer. Of course, the invention is not limited to the example shown in FIG. 24.

Figure 25:
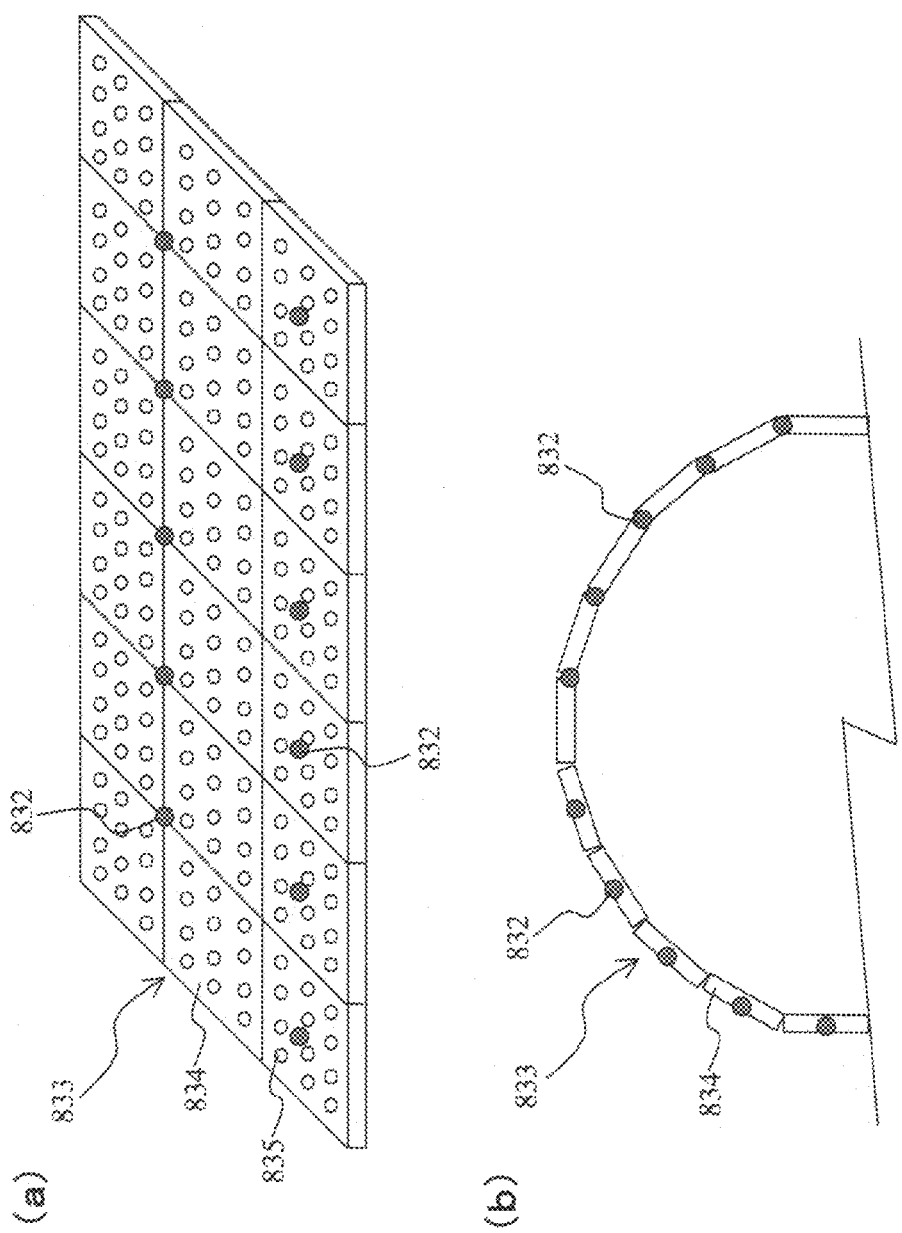
FIGS. 25(a) and 25(b) are schematic diagrams illustrating an example when flat and spherical light-emitting diode displays are used, respectively.

FIGS. 25(a) and 25(b) depict examples of multiple light-emitting diode panels (834) arranged into flat and spherical light-emitting diode displays (833), and infrared light sources (832). The light-emitting diode panel (834) is a panel having multiple small-sized LEDs (835) arranged in an array, and multiple panels are disposed adjacent to each other to configure a flat or spherical light-emitting diode display (833). In this case, the infrared light source (832) may be built in each of the light-emitting diode panels (834) together with other small-sized LEDs, or alternatively it may be built in the space between the light-emitting diode panels (834) so that audio signal modulated infrared light is emitted onto appropriate positions. Of course, the invention is not limited to the examples shown in FIG. 25.

Although the other flat panel displays are not shown in the drawings, an appropriate number of the infrared light sources may similarly be placed at appropriate positions so that audio signal modulated infrared light is emitted onto appropriate spot positions on the image display surface.

Furthermore, multiple infrared light sources (800), (804), (815), and (824) are each placed separately in each of the examples shown in the drawings, but it is acceptable that a surface emitting light source typified by a surface emitting LED is disposed at an appropriate position.

[3] Moreover, in the embodiments above, the same number of individual infrared light sources as the number of individual positions in the image to be irradiated is disposed. However, the number of the irradiation positions in the image is not necessarily equal to the number of the light sources as long as the irradiating direction of infrared rays can be controlled so as to be directed successively to each position in the image, and in this way light sources which are fewer than the positions to be irradiated, even a single light source, can suffice.

Figure 26:
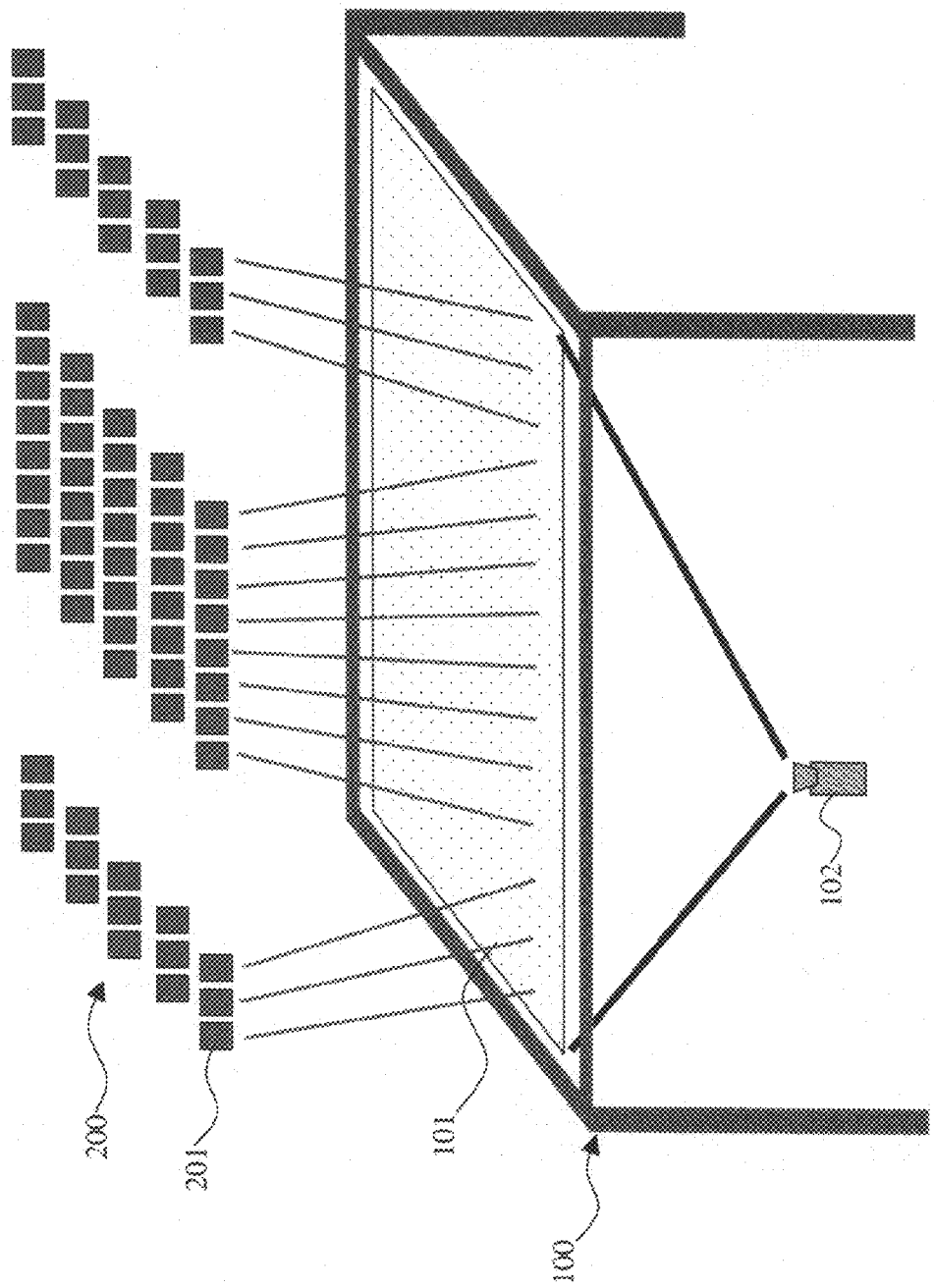
FIG. 26 is a schematic diagram illustrating an example when infrared light sources are placed on a top screen.
Figure 27:
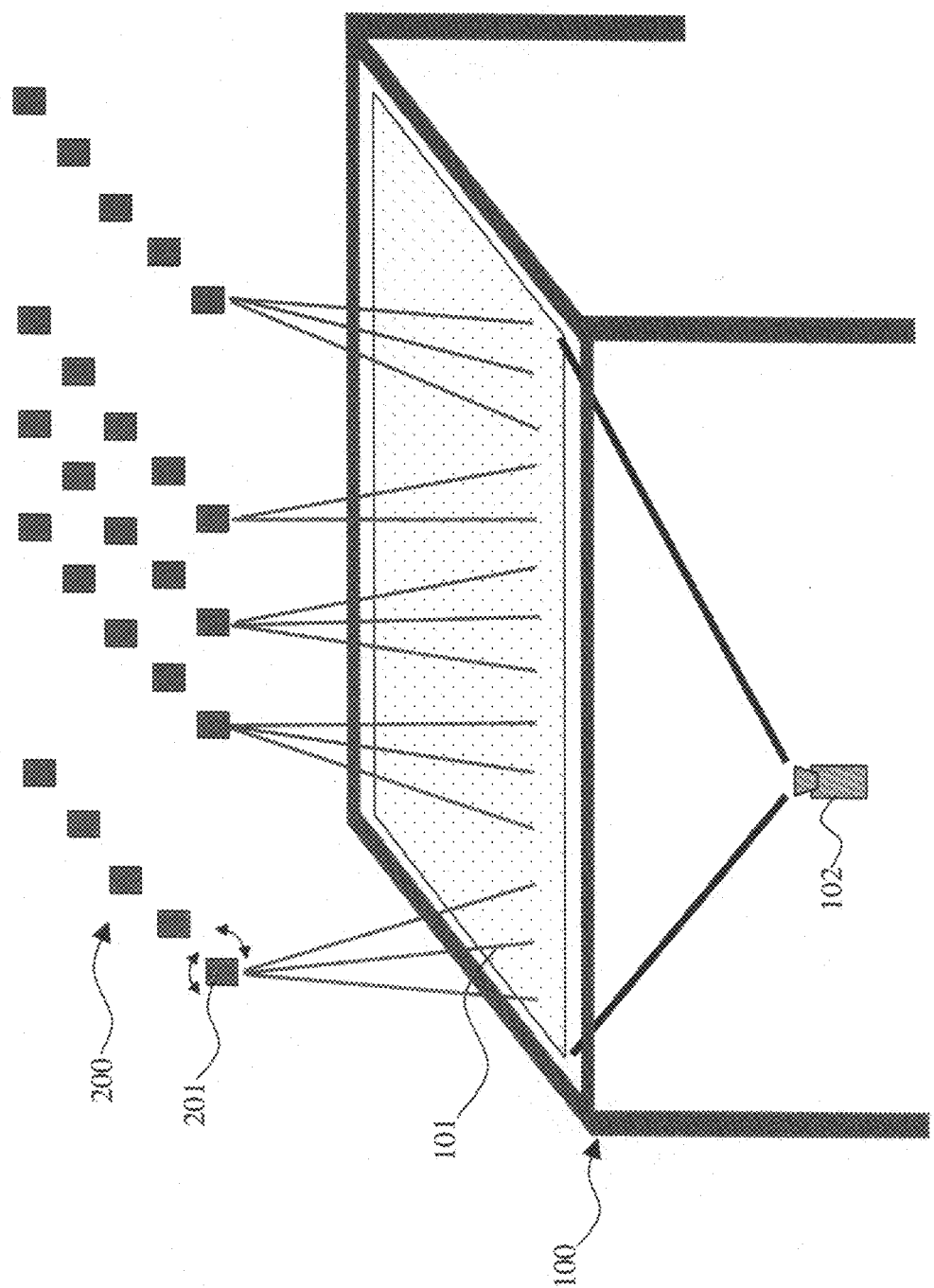
FIG. 27 is a schematic diagram illustrating another example when infrared light sources are placed on a top screen.

[4] Furthermore, in the embodiments above, audio signal modulated infrared light is irradiated from the back side of the image display surface, that is, the side opposite the image display surface, but the light may be emitted instead from the image display surface side. FIGS. 26 and 27 depict examples in this case; infrared light sources (201) are placed above the top screen (101). In addition, in FIG. 26, the same number of the light sources as the number of the irradiation positions is disposed, whereas in FIG. 27, each of the infrared light sources (201) is panned and tilted to change and control the irradiating direction as described above, and the number of the light sources is thus made smaller than the number of the irradiation positions.

[4] For the infrared light source (201), an infrared light-emitting diode (=infrared LED) can be used, for example.

[5] When increase in light quantity is desired in accordance with the distance from light source to the image display surface of the particular image display device, the individual infrared light sources (201) can each be a group of multiple infrared LEDs.

[6] For the electromagnetic wave irradiating means (22) of the audio output device (2), different light sources that output light other than infrared, such as visible light, can be used instead of the infrared light source (201).

[7] Moreover, for the light source, laser can be used instead of LEDs, and a configuration where light is emitted onto each of the spot positions in the image through an optical fiber is feasible.

[8] Of course, electromagnetic waves other than light, such as radio waves, can be utilized. In this case, an emitting source of the desired electromagnetic wave is used. Besides, it is needless to say that the various embodiments above need to be configured so as to be able to use the desired electromagnetic wave.

[9] In the embodiments shown in FIGS. 11 to 19, a finger wearable terminal (301) having a solar cell (302), a RFID tag (303), an optical ID tag (304), and a reflection sheet (305) is wearable on the finger of the terminal user (600). Furthermore, it is acceptable that a terminal is formed which is wearable on a part of a body other than a finger, such as a hand and a foot. A product that can be brought to touch or come close to the spot position in the shown image is acceptable. Therefore, in addition to a device that is wearable on a part of a body, for example, the device may be mountable on a rod (900) held by a terminal user (600) as shown in FIG. 28 or a product which is built therein beforehand.

Figure 28:
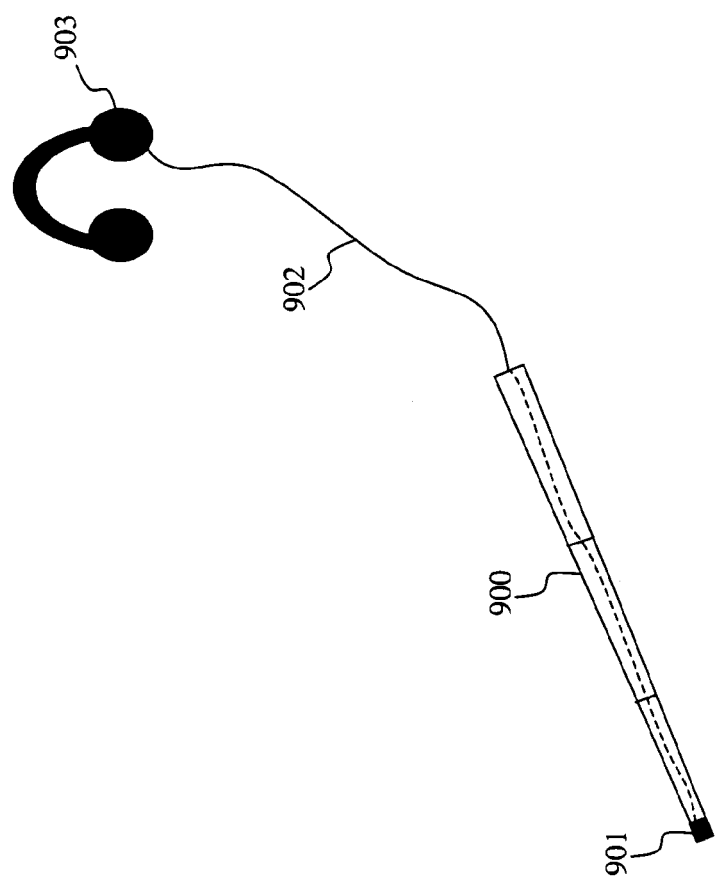
FIG. 28 is a schematic diagram illustrating an example of a rod.

In FIG. 28, a rod mountable terminal part (901) is detachably mounted on the tip end of an extensible rod (900). The rod mountable terminal part (901) is connected to an audio reproducing terminal part (903) such as an earphone, a headphone, or a speaker through a conductor (902) passing through the inside of the rod (900) (it may pass outside as well), and an electric signal output from a solar cell (not shown) is thus reproduced as sound. Moreover, for example, the earphone or headphone serving as the audio reproducing terminal (903) can be worn on the ear of the terminal user (600), and the speaker serving as the audio reproducing terminal (903) can be carried by the terminal user (600).

Figure 29:
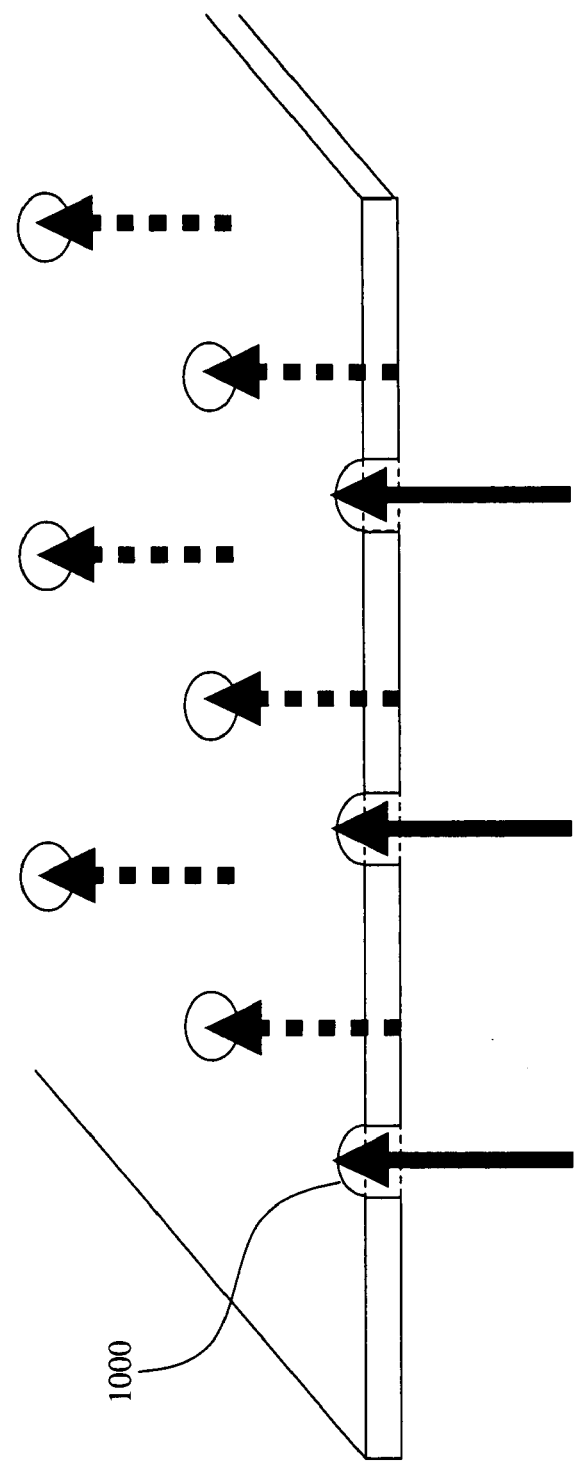
FIG. 29 is a schematic diagram illustrating an example of an image display surface.

[10] Moreover, the audio information support system can be adapted to a sound guide system for the visually handicapped. In this case, the user does not know which position in the image is irradiated with an electromagnetic wave such as infrared light, and thus, a small hole (1000) may be provided at each irradiation position on the image display surface as shown in the example of FIG. 29. Accordingly, the visually handicapped user touches a hole (1000) and thereby knows the irradiation position, and thus can receive appropriate audio information support. Furthermore, when a bit string indicating that the person is visually handicapped is embedded in ID data, this information can be obtained by the ID authentication, and audio information suitable for the visually handicapped can be offered in accordance with that determination. At this time, for example, the combination of ID and position determination allows audio guidance telling the user in which direction the finger, rod or the like should be moved from the irradiation position or the hole (1000) in the image being touched now to reach the next irradiation position or the hole (1000). For example, voice instructions can be made informing that the next hole is a bit to the right and a bit forward from the irradiation position or the hole (1000). Of course, this guide can be applied to the physically unimpaired as well.

Figure 30:
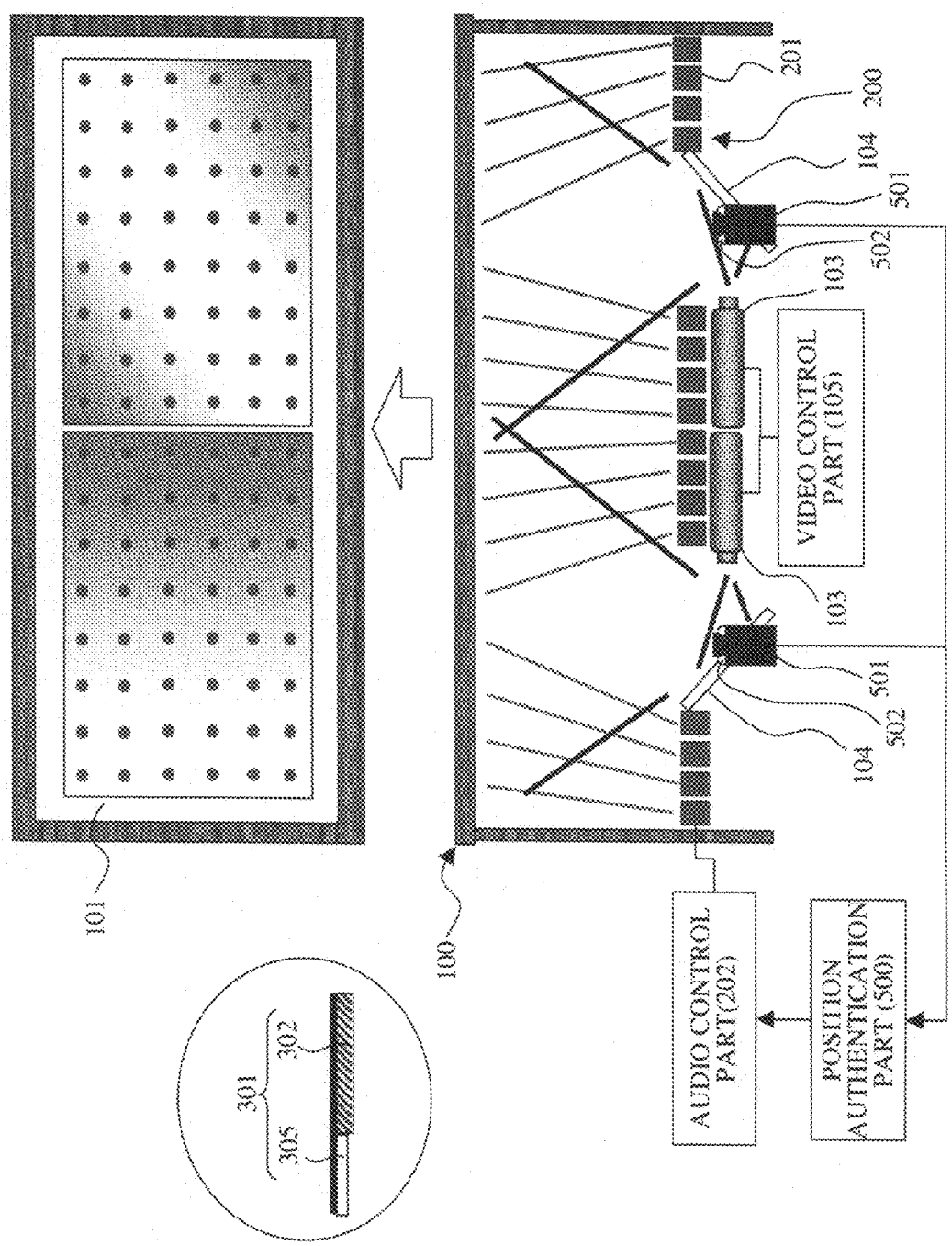
FIG. 30 is a schematic diagram illustrating another embodiment of position determination.

[11] Moreover, in the embodiments shown in FIGS. 15, 16, and 18, the infrared camera (501) and the infrared LED (502) which conduct position determination are disposed above the top screen (101), but it is feasible to dispose them below, as shown in FIG. 30 for example. In this case, preferably, the reflection sheet (306) is disposed on the same side as the solar cell (301), so that the position infrared light emitted from below is received and reflected back (see enlarged diagram in the drawing).

Figure 31:
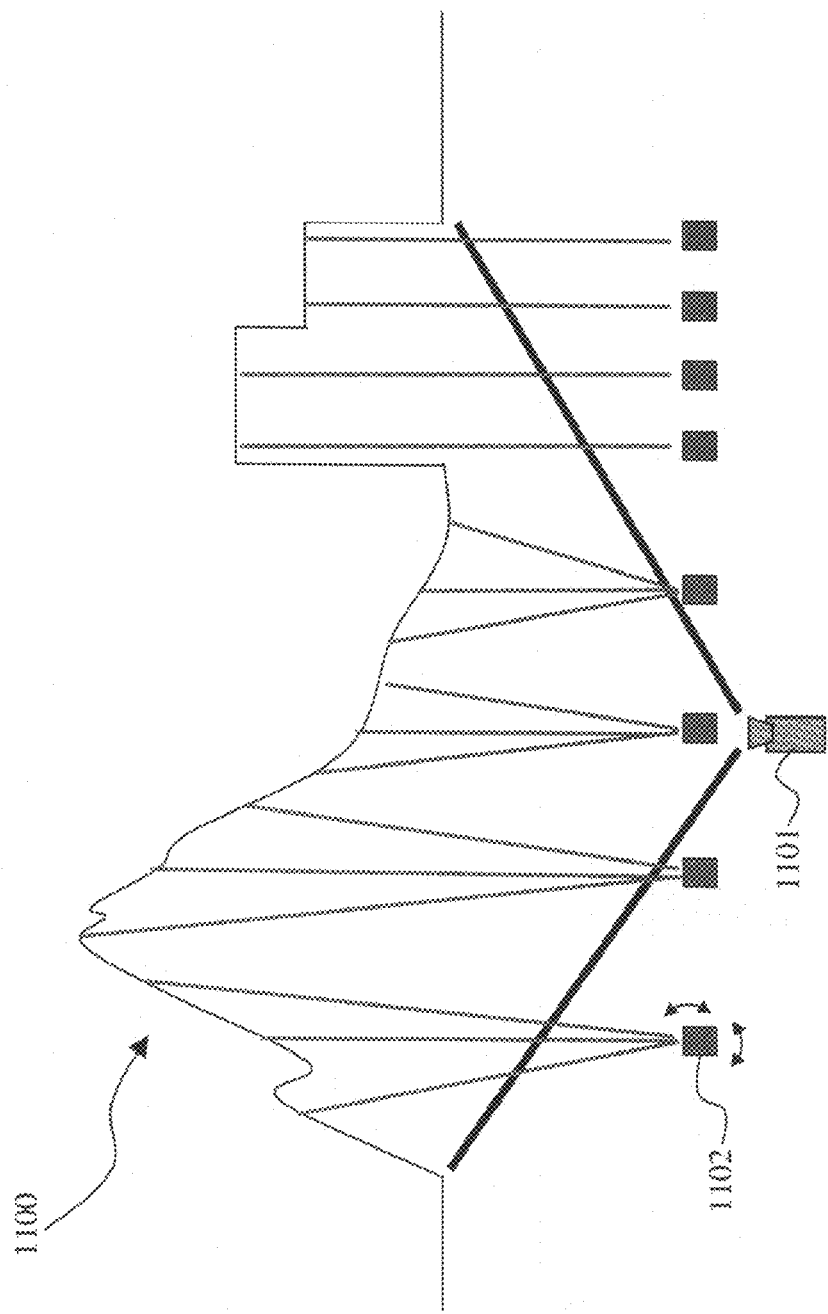
FIG. 31 is a schematic diagram illustrating an example of a three-dimensional screen.

[12] Furthermore, in the embodiments shown in FIGS. 11 to 20, the screen means (11) of the image display device (1) (the table (100) and the spherical screen (700) having the top screen (101)) have a smooth, flat or curved image display surface. However, the screen means (11) having an irregular image display surface with a combination of a flat surface, a curved surface, and the like can be used. FIG. 31 depicts an example in this case. An image is projected onto a three-dimensional screen (1100) having an irregular image display surface from a projector device (1101) to show a three-dimensional map, and an infrared light source (1102) irradiates audio signal modulated infrared light onto an appropriate position in the three-dimensional map.

[13] Moreover, the image display device (1) is not limited to products comprising screen means (11) and image projecting means (12) as in the embodiments above, and any device that shows an image is sufficient. For example, the audio information support system according to the invention of the application can be adapted to a device in which an image is coated or printed on the screen itself, and electromagnetic waves, typically infrared light, are passed through the screen.

INDUSTRIAL APPLICABILITY

As described above in detail, according to the invention of the application, a completely novel audio information support system is to be provided in which a user just points or touches a given position in the image shown on the screen in order to listen to audio information relating to the shown image, easily implementing audio information support that separately responds to individual users watching the image.

The invention claimed is:

1. An audio information support system characterized by comprising:
    an image display device which shows an image;
    an audio output device which outputs an electromagnetic wave modulated by audio information toward one or multiple positions in the image shown by the image display device; and
    an audio reproducing terminal having a converting means which receives the electromagnetic wave at the position in the image and converts it to an electric signal and an audio reproducing means which reproduces sound from the electric signal generated by the converting means.

2. The audio information support system according to claim 1, characterized in that the image display device has a screen means which shows an image and an image projecting means which projects an image onto the screen means.

3. The audio information support system according to claim 2, characterized in that the screen means has a flat, curved or irregular image display surface.

4. The audio information support system according to claim 2, characterized in that the screen means has a translucent image display surface.

5. The audio information support system according to claim 2, characterized in that the image projecting means projects an image onto the screen means from the image display surface side.

6. The audio information support system according to claim 2, characterized in that the image projecting means projects an image onto the screen means from opposite side of the image display surface.

7. The audio information support system according to claim 1, characterized in that the image display device is a cathode-ray tube display.

8. The audio information support system according to claim 1, characterized in that the image display device is a flat panel display.

9. The audio information support system according to claim 8, characterized in that the flat panel display is any one of a liquid crystal display, a plasma display, an electroluminescent display, a light-emitting diode display, a vacuum fluorescent display, and an electrolytic emission display.

10. The audio information support system according to claim 1, characterized in that the audio output device has a modulating means in which audio information modulates an electromagnetic wave and an electromagnetic wave irradiating means which emits the electromagnetic wave modulated by the modulating means toward the position in the image.

11. The audio information support system according to claim 10, characterized in that the electromagnetic wave irradiating means has an electromagnetic wave source which outputs an electromagnetic wave.

12. The audio information support system according to claim 11, characterized in that there is a plurality of the electromagnetic wave sources, each disposed so as to correspond respectively to the multiple positions in the image.

13. The audio information support system according to claim 11, characterized in that there is one or more of the electromagnetic wave sources that can change an emitting direction toward the multiple positions in the image.

14. The audio information support system according to claim 11, characterized in that the electromagnetic wave source is a light source which outputs light as an electromagnetic wave.

15. The audio information support system according to claim 14, characterized in that the light source is a light-emitting diode or laser.

16. The audio information support system according to claim 14, characterized in that light from the light source is emitted onto the position in the image through an optical cable.

17. The audio information support system according to claim 14, characterized in that the converting means of the audio reproducing terminal is a converting means which receives light from the light source of the electromagnetic wave irradiating means and performs photoelectric conversion.

18. The audio information support system according to claim 17, characterized in that the photoelectric converting means is a solar cell.

19. The audio information support system according to claim 1, characterized in that the converting means of the audio reproducing terminal can be worn on a part of a terminal user's body.

20. The audio information support system according to claim 19, characterized in that the part of the body is a hand or a foot.

21. The audio information support system according to claim 1, characterized in that the converting means of the audio reproducing terminal is mountable on or built in a pointing stick held by a terminal user.

22. The audio information support system according to claim 1, characterized in that the audio reproducing means of the audio reproducing terminal is an earphone, a headphone, or a speaker.

23. The audio information support system according to claim 1, characterized in that the audio reproducing terminal is a battery-less terminal that does not need a separate drive power source.

24. An audio information support system characterized by comprising:
  an image display device which shows an image;
  an audio output device which outputs an electromagnetic wave modulated by audio information toward one or multiple positions in the image shown by the image display device;
  an audio reproducing terminal having a converting means which receives the electromagnetic wave at the position in the image and converts it to an electric signal, an ID transmitting means which transmits an ID and an audio reproducing means which reproduces sound from the electric signal generated by the converting means; and
  an ID detection device which detects the ID transmitted from the ID transmitting means of the audio reproducing terminal.

25. The audio information support system according to claim 24, characterized in that the ID transmitting means of the audio reproducing terminal is an RFID tag and the ID detection device is a reader-writer that conducts communication with the RFID tag for ID authentication.

26. The audio information support system according to claim 24, characterized in that the ID transmitting means of the audio reproducing terminal is an optical ID tag and the ID detection device is an infrared sensor that receives ID infrared light emitted by the optical ID tag and outputs ID data.

27. The audio information support system according to claim 26, characterized in that:
  the optical ID tag has an infrared light source for ID information modulated infrared light, an ID storing means which stores ID data and a modulating means which modulates infrared light by ID data; and
  the infrared sensor receives ID information modulated infrared light which has been modulated and transmitted by the optical ID tag, and outputs ID data.

28. An audio information support system characterized by comprising:
  an image display device which shows an image;
  an audio output device which outputs an electromagnetic wave modulated by audio information, toward one or multiple positions in the image shown by the image display device;
  an audio reproducing terminal having a converting means which receives the electromagnetic wave at the position in the image and converts it to an electric signal and an audio reproducing means which reproduces sound from the electric signal generated by the converting means; and a position detection device which detects the position of the audio reproducing terminal.

29. The audio information support system according to claim 28, characterized in that: the position detection device has an infrared light source for positioning-use infrared light, an infrared imaging means which captures positioning-use infrared light reflected back by the audio reproducing terminal and a position detecting means which detects the position of the audio reproducing terminal based on the position of the infrared light image in the image taken by the infrared imaging means; and the audio reproducing terminal has a reflecting means which reflects the positioning-use infrared light transmitted from the position detection device.

30. The audio information support system according to claim 28, characterized in that the position detection device has a touch panel which is disposed on the image display surface of the image display device and a position detecting means which detects the position of the audio reproducing terminal based on the position where a terminal user touches the touch panel.

31. An audio information support system characterized by comprising:

an image display device which shows an image;

an audio output device which outputs an electromagnetic wave modulated by audio information toward one or multiple positions in the image shown by the image display device;

an audio reproducing terminal having a converting means which receives the electromagnetic wave at the position in the image and converts it to an electric signal, an audio reproducing means which reproduces the resulting electric signal by the converting means in sound and an ID transmitting means which transmits an ID;

an ID detection device which detects the ID transmitted from the ID transmitting means of the audio reproducing terminal; and a position detection device which detects the position of the audio reproducing terminal.

* * * * *